(12) United States Patent
Zavattieri et al.

(10) Patent No.: US 12,338,588 B2
(45) Date of Patent: *Jun. 24, 2025

(54) PHASE TRANSFORMING CELLULAR MATRIX (PXCM) BASED TILE DESIGN FOR A LIGHTWEIGHT RUNWAY MAT

(71) Applicant: Purdue Research Foundation, West Lafayette, IN (US)

(72) Inventors: Pablo Zavattieri, West Lafayette, IN (US); Scott Hartford, South Bend, IN (US); Kristiaan Hector, Shelby Township, MI (US)

(73) Assignee: Purdue Research Foundation, West Lafayette, IN (US)

( * ) Notice: Subject to any disclaimer, the term of this patent is extended or adjusted under 35 U.S.C. 154(b) by 790 days.

This patent is subject to a terminal disclaimer.

(21) Appl. No.: 17/382,039

(22) Filed: Jul. 21, 2021

(65) Prior Publication Data
US 2022/0120043 A1 Apr. 21, 2022

Related U.S. Application Data

(63) Continuation-in-part of application No. 17/245,154, filed on Apr. 30, 2021, now Pat. No. 12,018,443.
(60) Provisional application No. 63/047,006, filed on Jul. 1, 2020.

(51) Int. Cl.
*E01C 9/08* (2006.01)
*B32B 3/12* (2006.01)
(Continued)

(52) U.S. Cl.
CPC ............... *E01C 9/083* (2013.01); *B32B 3/12* (2013.01); *B32B 15/012* (2013.01); *B64F 1/36* (2013.01);
(Continued)

(58) Field of Classification Search
CPC ... E01C 3/006; E01C 5/18; E01C 5/22; E01C 9/00; E01C 9/083; E01C 11/02;
(Continued)

(56) References Cited

U.S. PATENT DOCUMENTS

| 4,202,646 A | 5/1980 | Herstad |
| 4,362,780 A | 12/1982 | Marzocchi |

(Continued)

*Primary Examiner* — Raymond W Addie
(74) *Attorney, Agent, or Firm* — David E. Novak; Brannon Sowers & Cracraft PC

(57) ABSTRACT

A flexible mat system, including a plurality of base platforms, each respective base platform having a first pattern of phase transforming columns and voids extending from a respective flat member, and a plurality of plane-engaging runway platforms, each respective plane-engaging runway platform having a second, reversed pattern of phase transforming columns and voids extending from a respective flat member such that each respective plane-engaging runway platform is lockingly engagable to a respective base platform to yield a landing segment with parallel top and bottom flat members. Each respective base platform is an aluminum/steel composite. Each respective phase transforming column is further comprised of a plurality of stacked operationally connected phase transforming cellular members. Each respective cell further comprises six hexagonally spaced support members defining six hexagonally arrayed sides, with two opposing sides define x-shaped struts extending between adjacent support members. Remaining sides define parallel struts extending between adjacent support members. Each respective phase transforming cellular member can shift from a first stable configuration to a second stable configuration in response to an applied load.

18 Claims, 28 Drawing Sheets

(51) Int. Cl.

| | |
|---|---|
| *B32B 15/01* | (2006.01) |
| *B64F 1/36* | (2017.01) |
| *E01C 3/00* | (2006.01) |
| *E01C 5/18* | (2006.01) |
| *E01C 9/00* | (2006.01) |
| *E01C 11/02* | (2006.01) |
| *E01C 5/22* | (2006.01) |

(52) U.S. Cl.
CPC ............... *E01C 3/006* (2013.01); *E01C 5/18* (2013.01); *E01C 9/00* (2013.01); *E01C 11/02* (2013.01); *B32B 2307/56* (2013.01); *B32B 2471/04* (2013.01); *E01C 5/22* (2013.01)

(58) Field of Classification Search
CPC ..... B32B 3/12; B32B 15/012; B32B 2307/56; B32B 2471/04; B64F 1/36
USPC ...................................... 404/17–46
See application file for complete search history.

(56) References Cited

U.S. PATENT DOCUMENTS

| | | |
|---|---|---|
| 5,013,029 A | 5/1991 | Vaux |
| 5,160,215 A | 11/1992 | Jensen |
| 5,234,738 A | 8/1993 | Wolf |
| 8,683,769 B2 | 4/2014 | Cerny |
| 2006/0165486 A1 | 7/2006 | Ungurean |
| 2009/0242731 A1 | 10/2009 | Dinkins |
| 2023/0124425 A1 | 4/2023 | Svab |

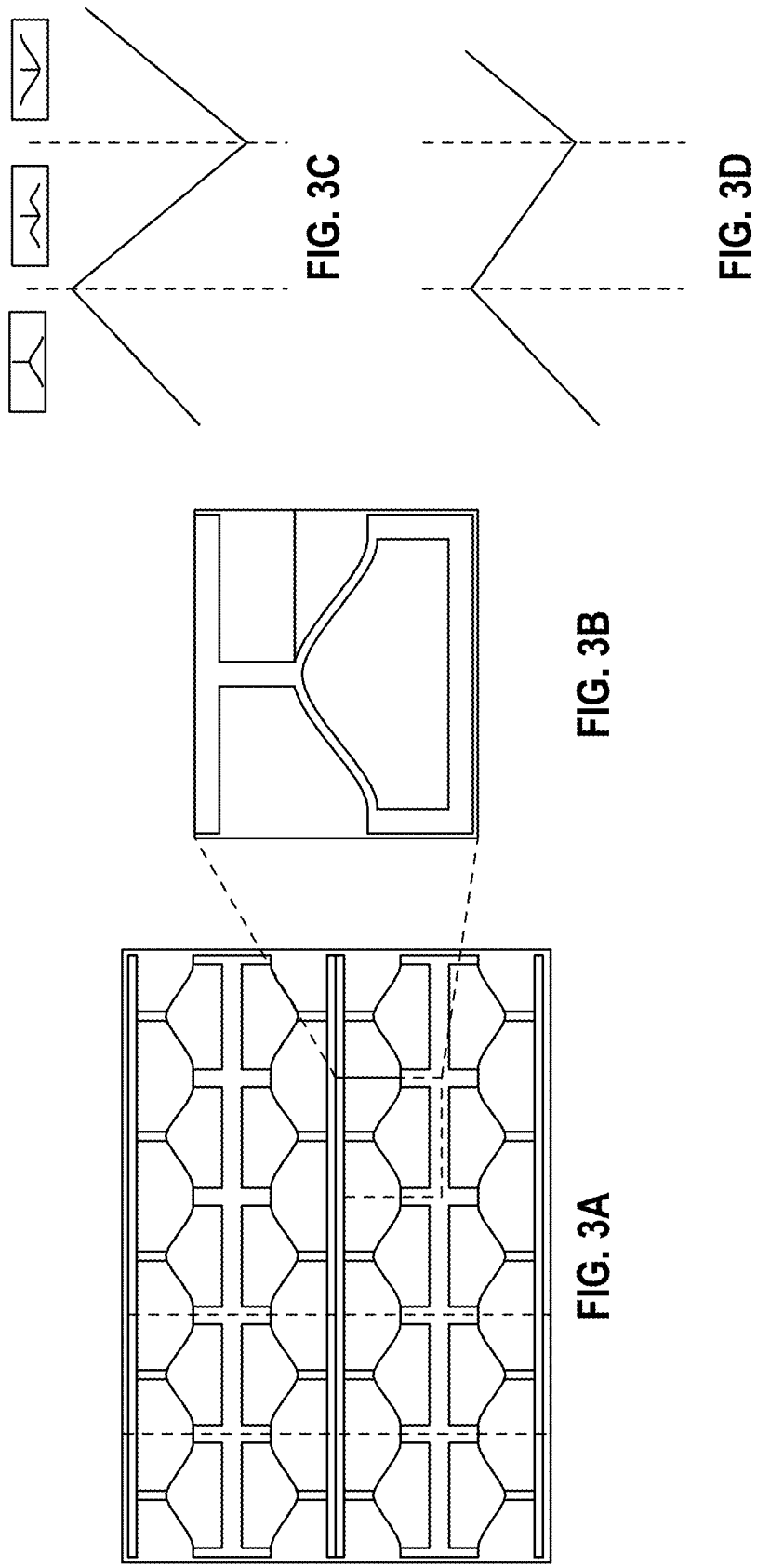

| Design | Yield Load (kN) | Mass/Col (kg) |
|---|---|---|
| 1A | 0.32 | 0.00584 |
| 2A | 0.26 | 0.00254 |
| 3A | 0.12 | 7.52e-04 |
| 4A | 0.52 | 0.00449 |
| 5A | 0.57 | 0.00301 |
| 6A | 0.59 | 0.00478 |
| 7A | 0.88 | 0.00357 |
| 8A | 2.24 | 0.0142 |
FIG. 9B
| Design | Yield Load (kN) | Mass/Cell (kg) |
|---|---|---|
| 8A | 2.24 | 0.0142 |
| 1B | 3.26 | 0.0128 |
| 2B | 4.35 | >0.0080 |
| 3B | 1.00 | >0.0080 |
| 4B | 1.42 | >0.0080 |
| 5B | 1.85 | >0.0142 |
| 6B | 12.00 | >0.0142 |
| 7B | 2.08 | >0.0144 |
| 8B | 4.4 | >0.0159 |
| 9B | 2.1 | >0.0140 |
| 10B | 2.1 | >0.0147 |
FIG. 10B
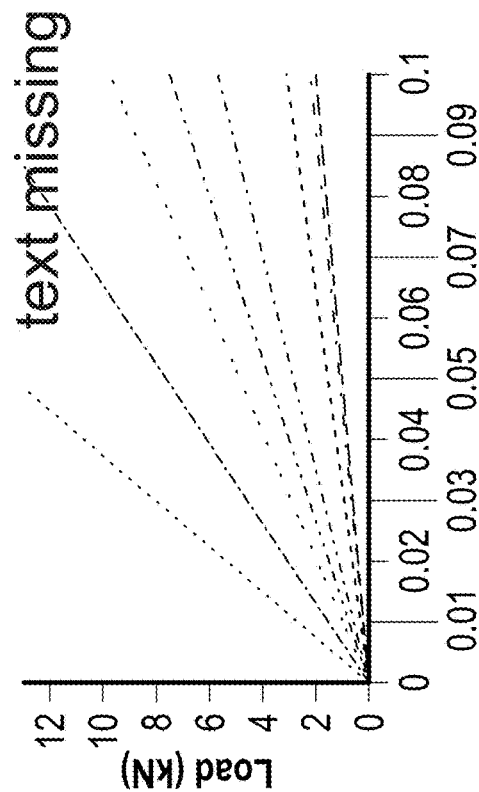
FIG. 9A
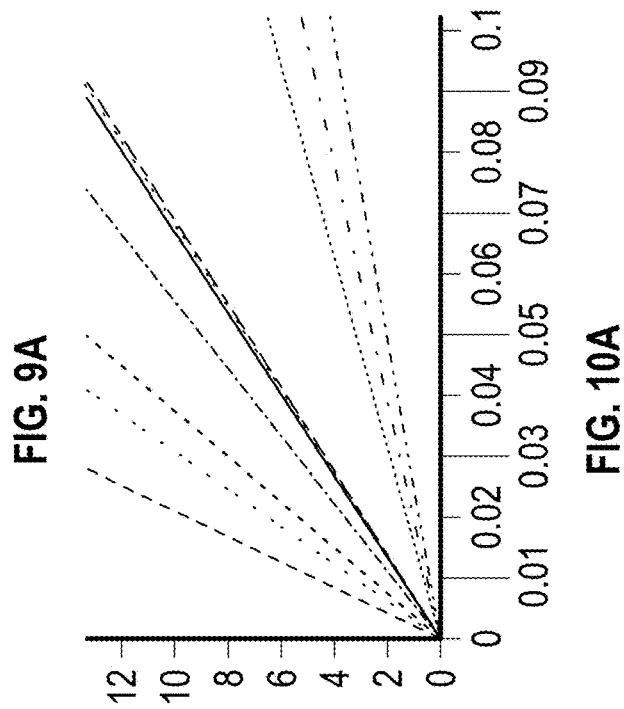
FIG. 10A

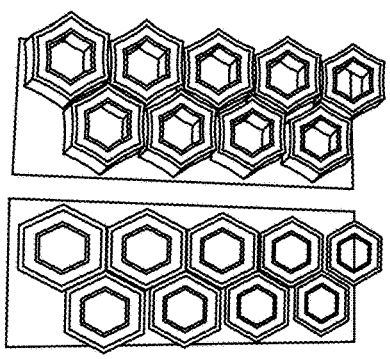
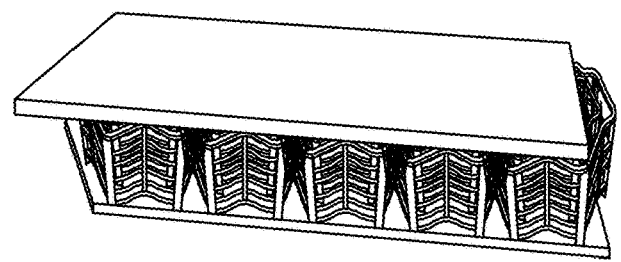
FIG. 13A　　　　　　　FIG. 13B
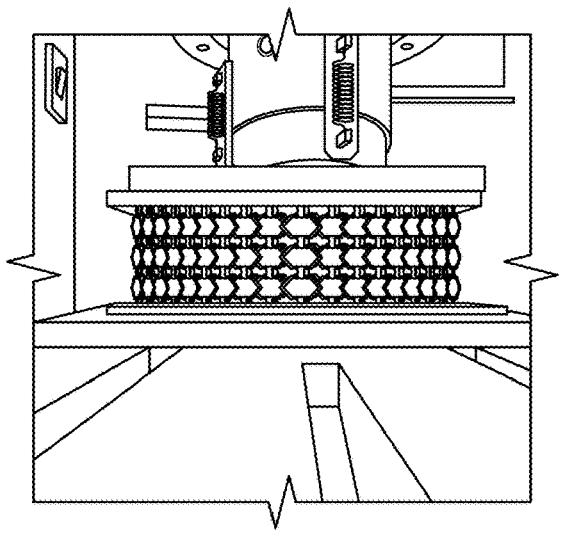
FIG. 13C
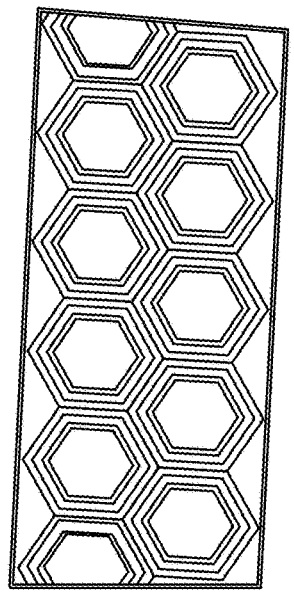
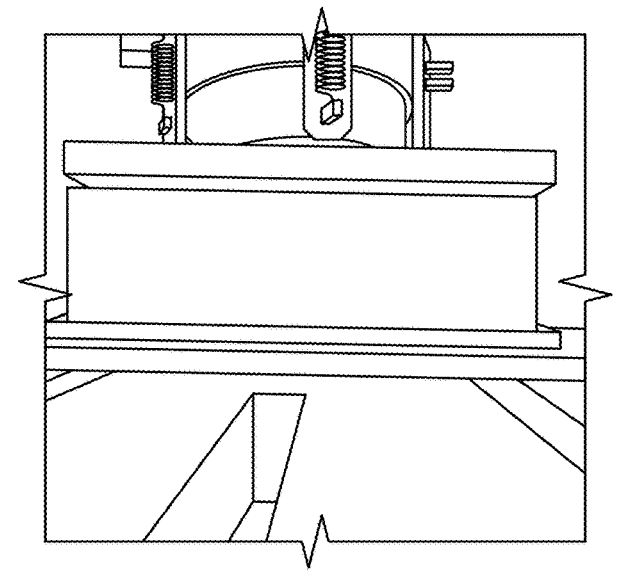
FIG. 13D　　　　　　　FIG. 13E

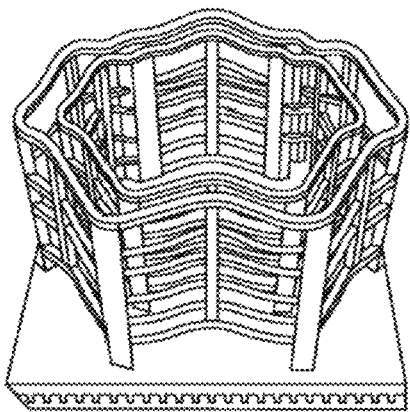 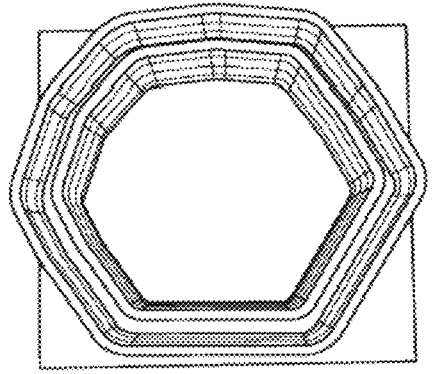
FIG. 16D     FIG. 16E
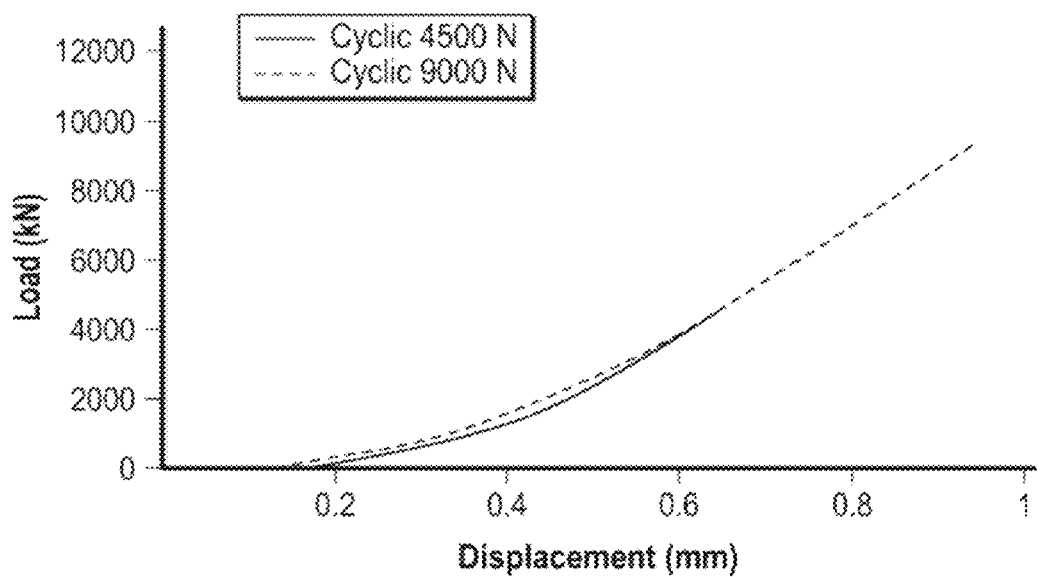
FIG. 16F

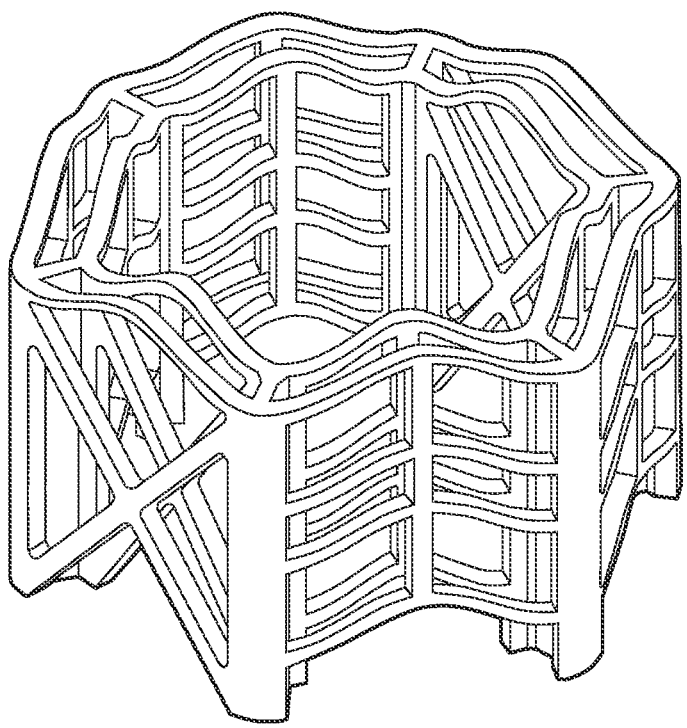
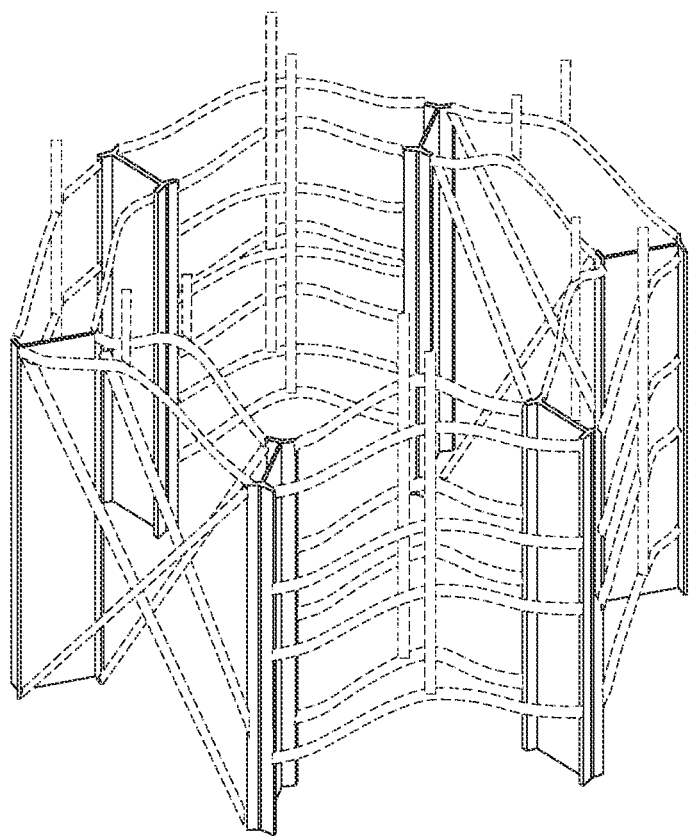
FIG. 20A

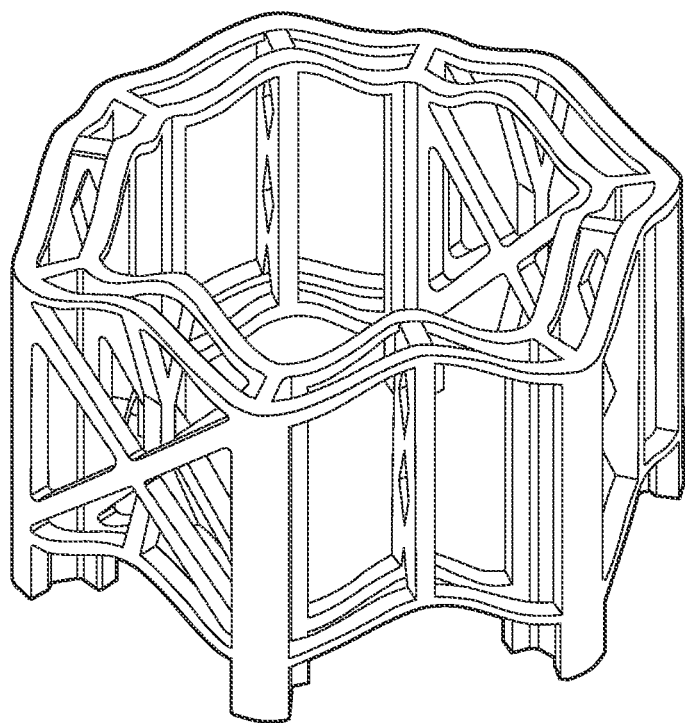
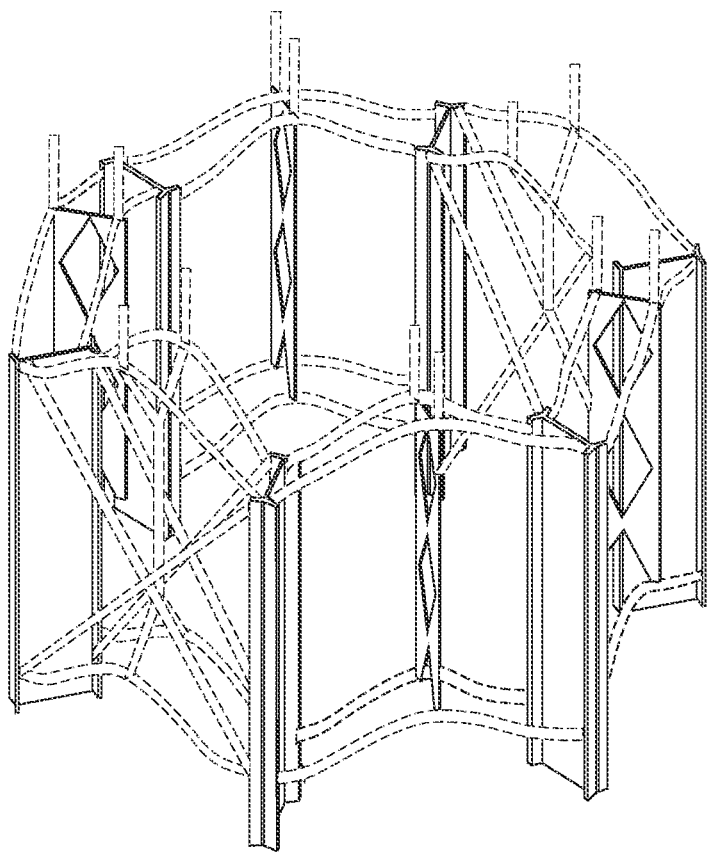
FIG. 20B

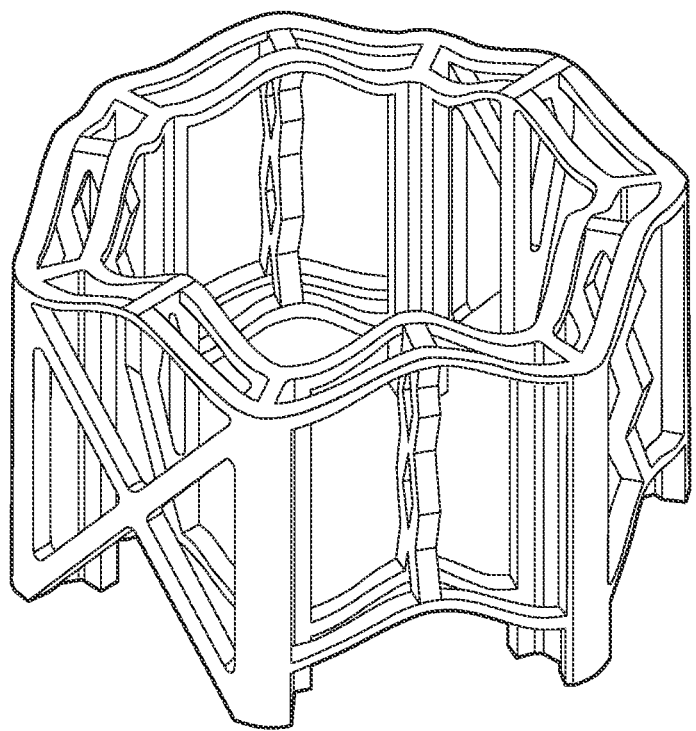
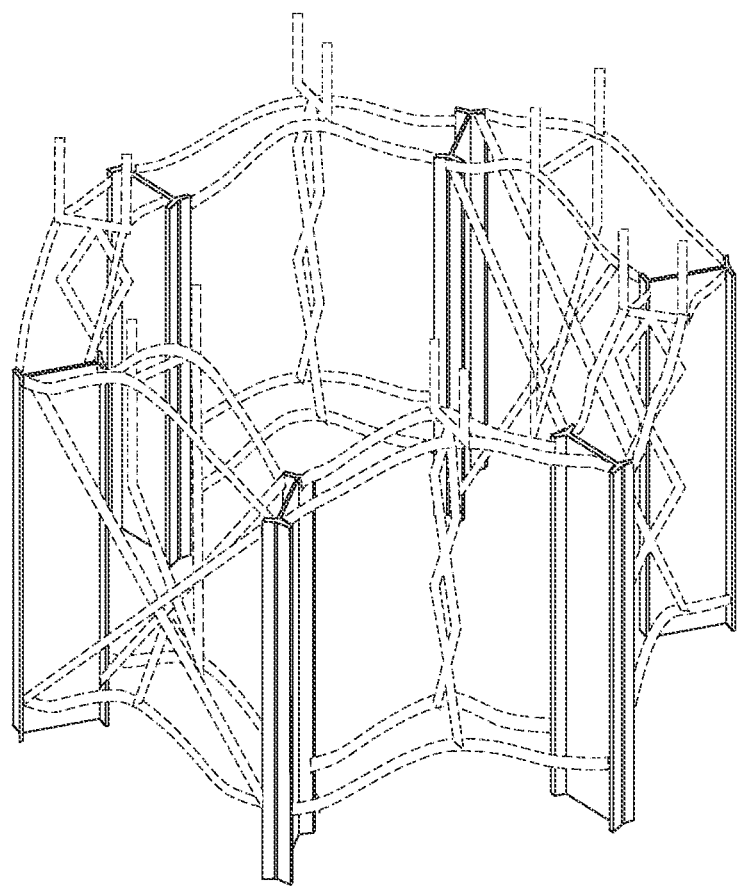
FIG. 20C

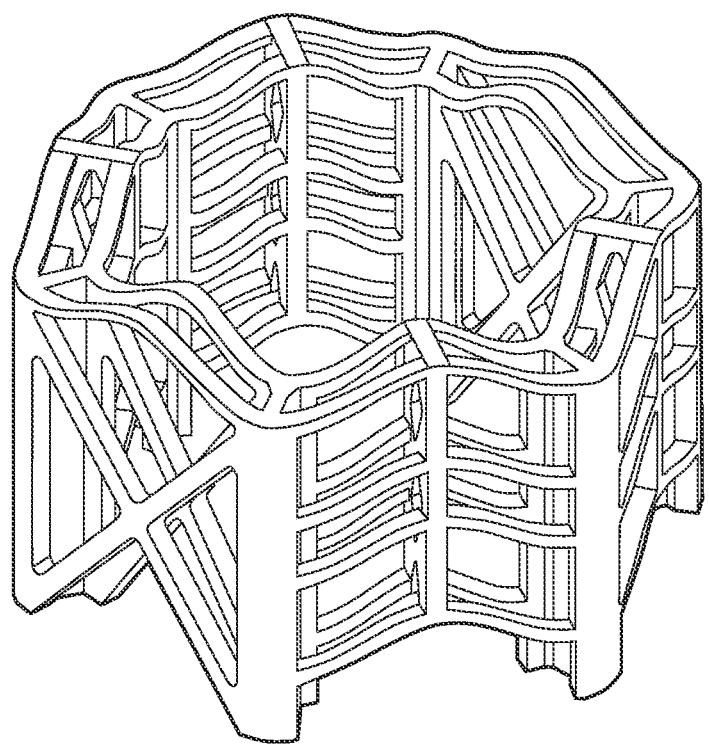
FIG. 20D
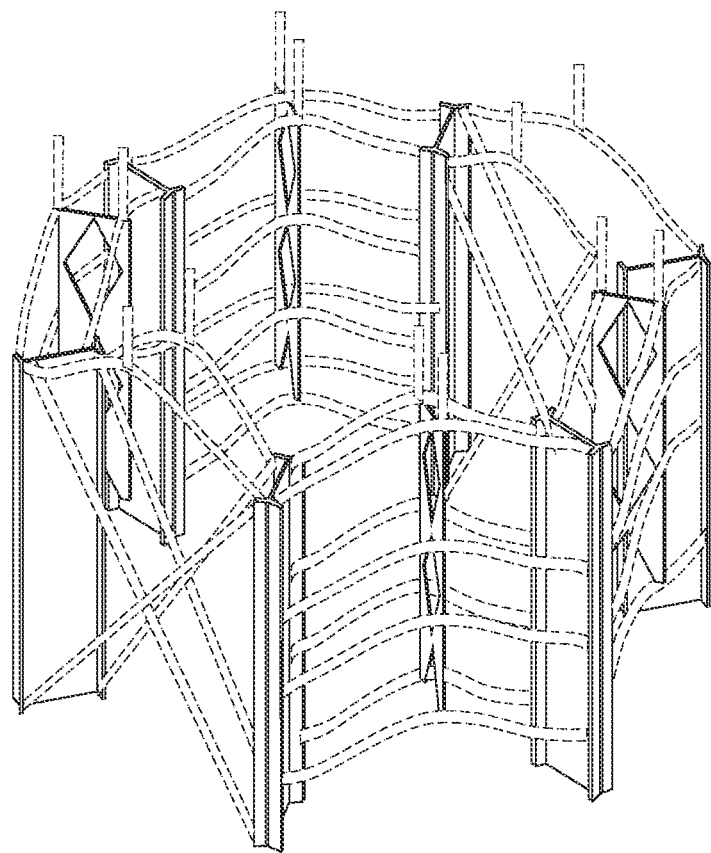

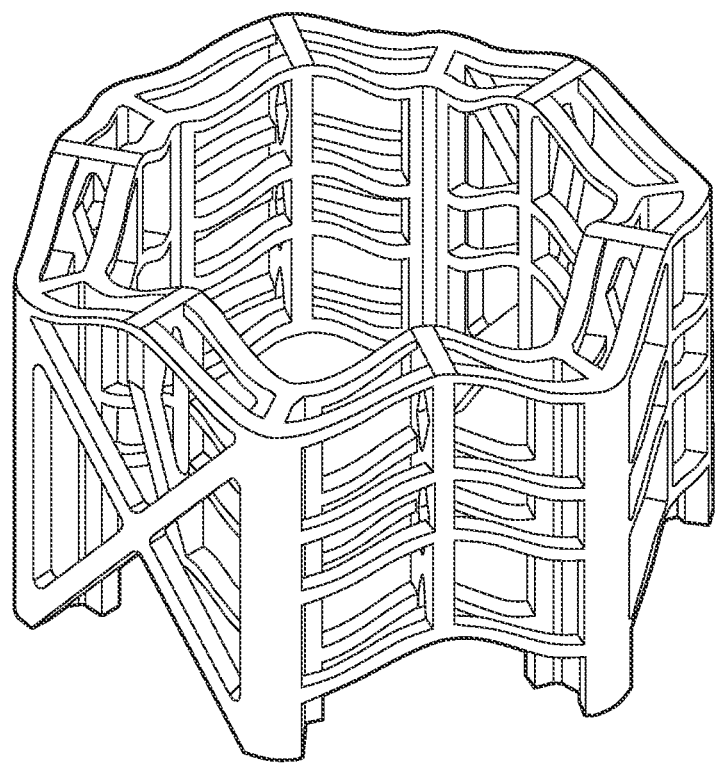
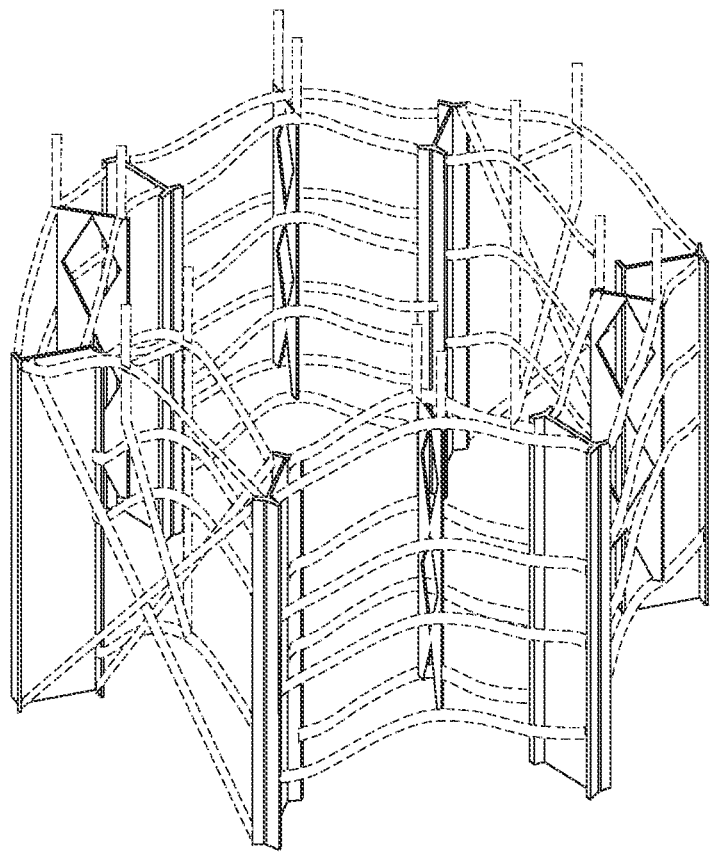
FIG. 20E

PHASE TRANSFORMING CELLULAR MATRIX (PXCM) BASED TILE DESIGN FOR A LIGHTWEIGHT RUNWAY MAT

CROSS-REFERENCE TO RELATED APPLICATIONS

This patent application claims priority to co-pending U.S. nonprovisional patent application Ser. No. 17/245,154, filed on Apr. 30, 2021, which claimed priority to then provisional patent application Ser. No. 63/047,006, filed on Jul. 1, 2020.

FUNDING STATEMENT

This invention was made with government support under FA805119CA006 awarded by the US Air Force. The government has certain rights in the invention.

TECHNICAL FIELD

The present novel technology relates generally to materials science, and, more specifically, to a phase-transformable cellular matrix tile mat.

BACKGROUND

The AM2 Mat, developed in the 1960s, has served as the U.S. Military as airfield matting technology for temporary runways, taxiways, and parking aprons, and has a long history of satisfactory performance. The AM2 matting surface consists of interlocking 2-ft by 12-ft and 2-ft by 6 ft 6061-T6 aluminum extruded panels that are 1.5 inches thick. Each of the AM2 panels defining the matting surface are joined along the two long edges by a hinge-pipe male/female connection. The short edges, joined by an overlap/underlap connection are secured by an aluminum locking bar. Each of the panels are coated with a non-skid material to increase surface friction. Studies have shown that these connections are the primary point of panel failure under several repeated passes. Depending upon the design generation of the AM2 panels, they can survive anywhere between approximately 750-2050 passes before failure. However, the weight and dimensions for this airfield matting technology are the primary limitations that determine the feasibility of its deployment. Individual panels are heavy, awkward, and laborious to install by hand. Aircraft payload is often exceeded, and a large number of aircraft are required to transport the AM2 matting technology to the required locations. Thus, there remains a need for an improved temporary runway assembly that is easy to deploy and remove, flexible, easy to transport, and that will survive more than 2500 landing and takeoff cycles. The present novel technology addresses this need.

BRIEF DESCRIPTION OF DRAWINGS

FIG. 3A graphically illustrates the dimensional relationship of a PXCM structure with columns of building blocks connected in parallel.

FIG. 3B schematically illustrates a PXCM unit cell having a sinusoidal beam as the snapping mechanism.

FIG. 3C graphically illustrates the load displacement curve of a bistable unit cell (Q>3) of FIG. 3B.

FIG. 3D graphically illustrates the load displacement curve of a metastable unit cell (Q<3) of FIG. 3B.

FIG. 9A graphically illustrates load as a function of displacement for each design in Set A.

FIG. 9B is a tabular illustration of yield loads and mass for each PXCM column of FIG. 9A.

FIG. 10A graphically illustrates load as a function of displacement for each design in Set B.

FIG. 10B is a tabular illustration of yield loads and mass for each PXCM column of FIG. 10A.

FIG. 13A is a perspective view of a hexagonal columnar PXCM mat with top and bottom portions disengaged.

FIG. 13B is a perspective view of a hexagonal columnar PXCM mat with top and bottom portions engaged.

FIG. 13C is an elevation view of the hexagonal columnar PXCM mat of FIG. 13B under loading and without foam infiltration.

FIG. 13D is a top plan view of the mat of FIG. 13B with foam infiltration.

FIG. 13E is an elevation view of the hexagonal columnar PXCM mat of FIG. 13B under loading and with foam infiltration.

FIG. 16D is a first top perspective view of a PXCM column of design 2c_4.

FIG. 16E is a second top perspective view of the PXCM column of FIG. 16D.

FIG. 16F graphically illustrates displacement as a function of cyclic loading for FIG. 16D.

FIG. 20 is a perspective view of a plurality of hexagonal PXCM column configurations.

DETAILED DESCRIPTION

Figure 1:
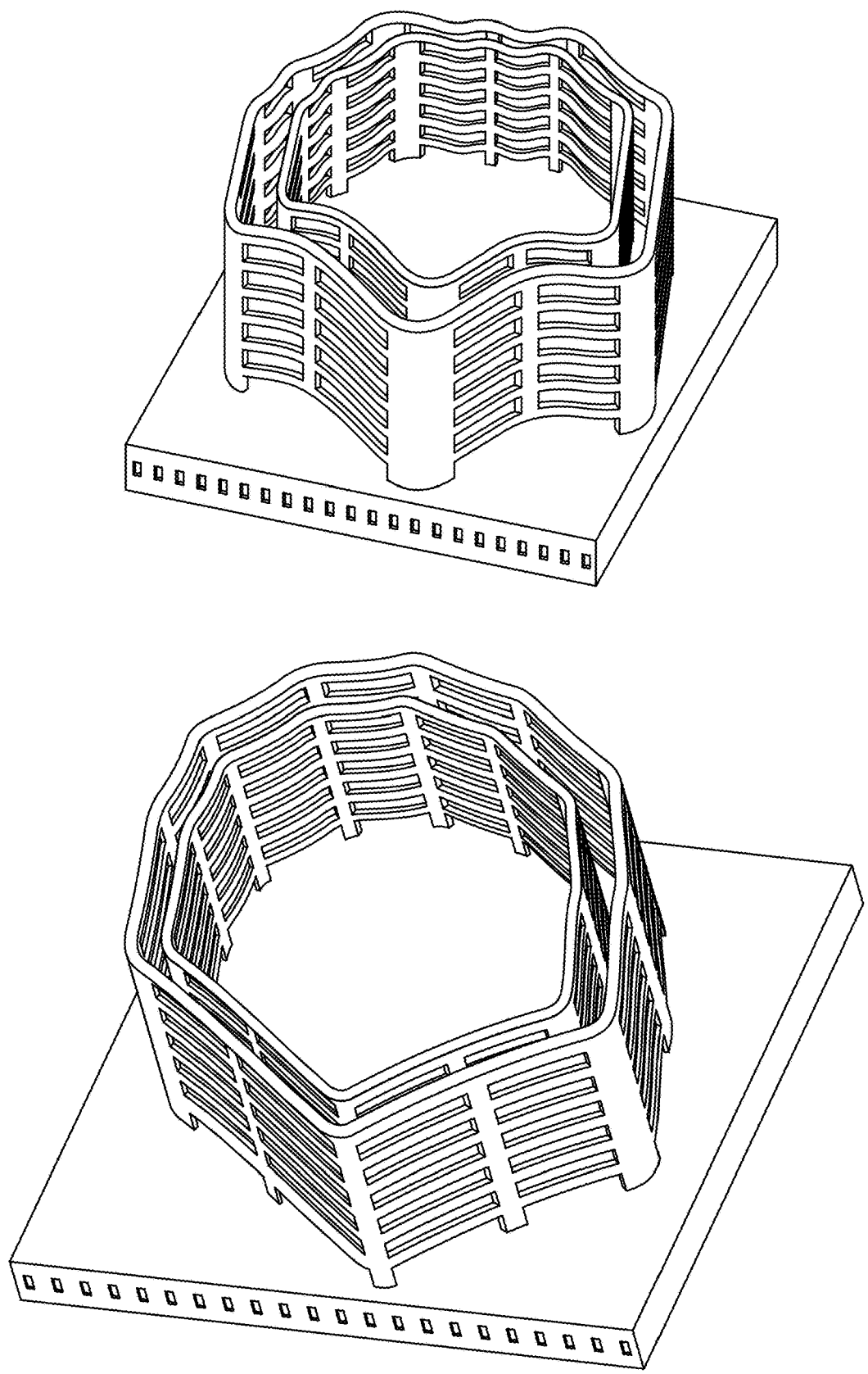
FIG. 1 is a perspective view of concentric multi-beam phase transforming cellular matrix (PXCM) materials used in a first embodiment temporary runway mat of the present novel technology.

Before the present methods, implementations, and systems are disclosed and described, it is to be understood that this invention is not limited to specific synthetic methods, specific components, implementation, or to particular compositions, and as such may, of course, vary. It is also to be understood that the terminology used herein is for the purpose of describing particular implementations only and is not intended to be limiting.

Overview

The present novel technology relates to a deployable impact absorbing mat, such as a temporary aircraft runway mat, made from a novel cellular material exhibiting discrete phase transformations. Phase transformations are initiated by introducing changes to the geometry of the unit cells that define these materials while keeping topology constant. Phase transformations may be introduced into the novel cellular materials via bistable/metastable compliant mechanisms to form the microstructure of cellular materials.

A phase transformation is the change of a thermodynamic system from one phase to another. Martensitic phase transformations play a fundamental role in the behavior of a large class of active materials which include shape memory, ferroelectric and some magnetostrictive alloys. Typical solid-state phase transformations in materials result from a change in the packing arrangement of the atoms in the unit cell. At the micro level, these changes can be viewed as multi-stable devices that deform switching between locally stable configurations, and macroscopically the switching phenomena manifest through the evolution of the domain microstructures in which the associated energy landscapes are usually extremely wiggly. However, there remains a need to extend this notion of solid-state phase transformations to cellular materials, where phase transformations are represented by changes in the geometry of its microstructure.

The novel aircraft runway mat cellular material includes bistable or metastable mechanisms as a unit cell for its microstructure. A bistable mechanism has two stable configurations when unloaded. Once this mechanism is in one stable configuration, it remains there unless it is provided with enough energy to move to the other stable configuration. A metastable mechanism corresponds to a special case of stability in which a small disturbance can lead to another stable state that has a lower potential energy. The phase transformation capability of this new type of cellular material will be attained mainly by proper choice of base material, cell topology and geometrical design of the unit cell. The unit cell of the microstructure comprises a bistable mechanism in which the two stable configurations correspond to stable configurations of the phase transforming material. Phase transformation occurs when there is a progressive change of configurations from cell to cell leading to a saw-tooth like force-displacement behavior. Each stable/metastable configuration of the unit cell corresponds to a phase, and transitions between these phases are interpreted as phase transformations for the material.

Figure 2C:
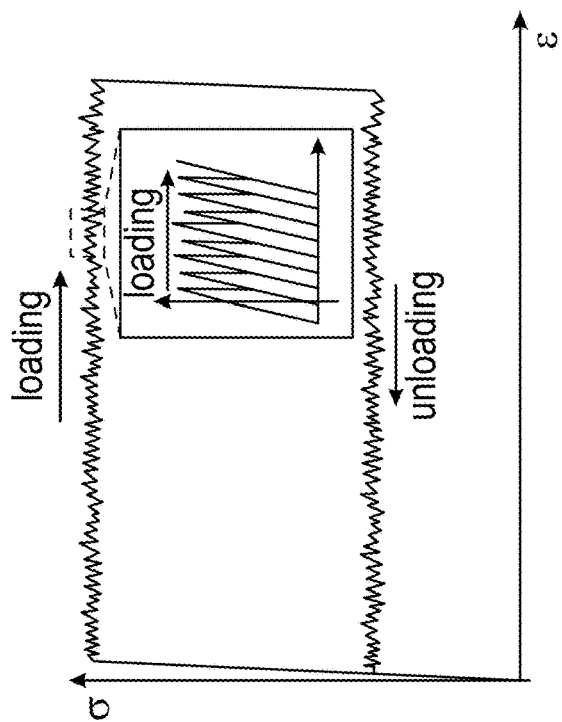
FIG. 2C graphically illustrates the stress-strain relationship for a phase transforming metamaterial made of a plurality of building blocks of FIG. 2A.
Figure 2B:
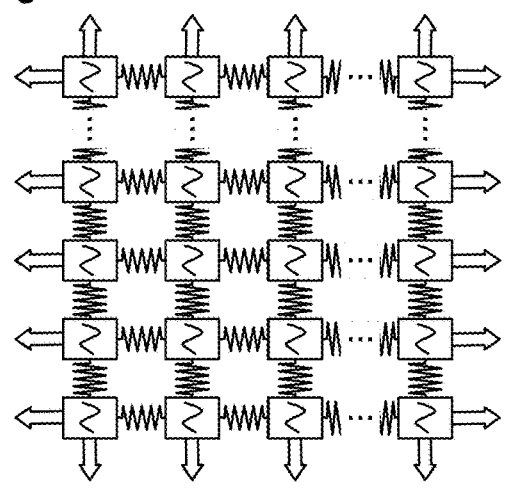
FIG. 2B graphically illustrates a PXCM made of several operationally connected building blocks of FIG. 2A.
Figure 2A:
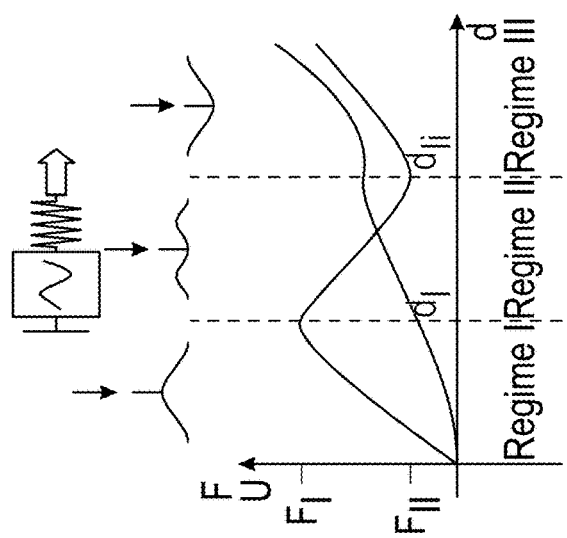
FIG. 2A schematically illustrates a basic building block (unit cell) containing a metastable mechanism and a linear spring, force and energy as a function of deformation.
Figure 4A:
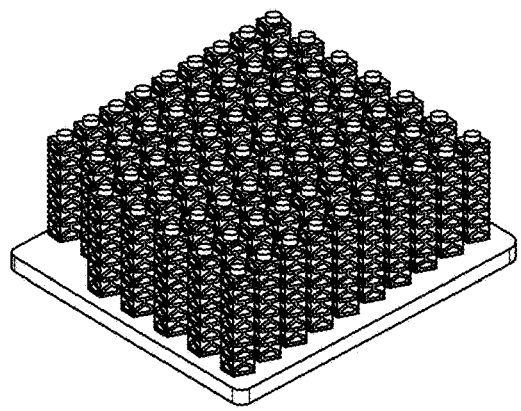
FIG. 4A is a perspective view of a plurality of regular polygon columns defining a PXCM mat portion.
Figure 4B:
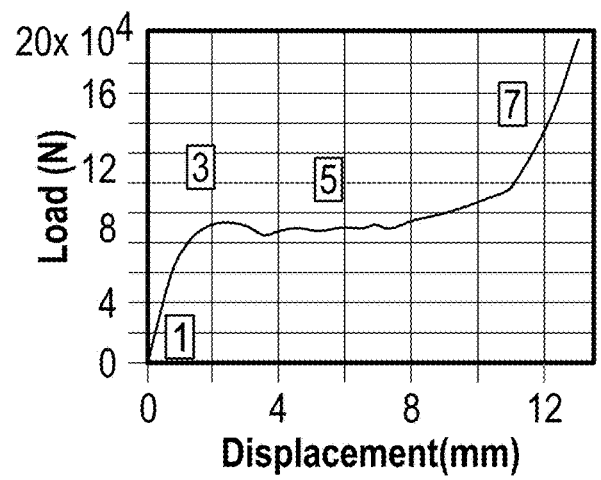
FIG. 4B graphically illustrates the load/displacement relationship for FIG. 4A.

The novel temporary aircraft runway mat assembly is illustrated in FIGS. 1-18B. A schematic of these new materials is shown in FIG. 2, where an individual building block comprising compliant metastable mechanisms and a linear elastic component (depicted as a block with a spring in FIG. 2A) are tiled in periodic arrangement forming a cellular material (FIG. 2B). Phase transforming materials based in cellular solids allow for an increased application of cellular materials in areas like wave guiding, energy harvesting, energy dissipation and material actuation, enabling new applications that were not possible before. These materials are referred to as Phase-Transformed Cellular Materials (PXCMs) because they resemble the process of phase transformation at the atomic scale. However, in this instance phase transformation is triggered by individual bistable or metastable mechanisms that are repeated throughout the materials, and therefore provide the novel behavior of what would be otherwise a normal cellular/lattice structure. These bistable and metastable mechanisms can be attained only by design. They do not require any specific material composition for their construction, although the base material typically exhibits some degree of elastic behavior.

The geometry of the PXCM unit cell is shown in FIG. 3A. The snapping mechanism that allows the unit cell to transition between stable and metastable configurations is the sinusoidal beam that is inserted between two vertical stiff walls. All displacement that applied to the sinusoidal beam is done so from a central vertical wall extruding from the beam's apex. The mechanism, Q of the sinusoidal beam is the ratio of the beam's amplitude, A, to its in-plane thickness, t. It is the value of the mechanism Q that determines whether the sinusoidal beam in the PXCM unit cell will be metastable (FIG. 3A) and have only one stable configuration or bistable (FIG. 3B) and have two stable configurations. Generally, PXCM unit cells with $Q \leq 3$ have a metastable mechanism and unit cells with $Q > 3$ are bistable. Additionally, if enough unit cells (~8) are connected in a column within the PXCM material, a snap-through behavior can be exhibited under displacement control, resulting in a phase transformation and energy dissipation (FIG. 2C).

Honeycombs present remarkable energy absorption when loaded out of plane due to the large amounts of energy dissipated in the plastic deformation of the honeycomb walls. In consequence, the fabrication of honeycombs materials whose walls are made of PXCMs offer an advantage by allowing dissipation based on elastic deformation of the base material. As in the case of 1D PXCMs, these systems show an energy absorption performance that is comparable to metal and polymeric foams and low-density micro-lattices. Further exploration of hierarchical PXCMs can be made by combining analytical and computational analyses in combination with experiments at different scales and strain rates.

The flexibility of Additive Manufacturing (AM) gives engineers virtually limitless design freedom to produce engineered structures (or combination of structures) to meet the repetitive loading conditions of aircraft take-off and landing cycles. An example of such a structure was previously executed as a fabrication and mechanical testing of a metal 3D-printed hierarchical PXCMs (similar to that shown in FIG. 4) was conducted.

The process is capable of using a variety of high-strength alloys (e.g. stainless steel, titanium and IN718). Here, an additively manufactured lightweight PXCM structure-based alternative to the current AM2 mat system is explored. An iterative design and experimental validation approach produced the CMB ePXCM geometry (FIG. 1) that demonstrates both the printing feasibility and the improved efficiency of deployment and repair given the CMB ePXCM tile concept's naturally affinity for self-alignment and ease of assembly that is capable of sustaining the vertical and shear loads required to safely land an F-15E aircraft.

Figure 5A:
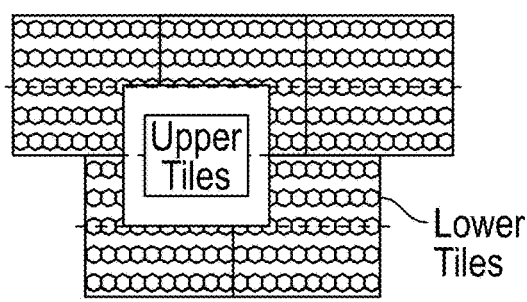
FIG. 5A is a partial top plan view of a mat portion having a lower layer of tiles over which an upper layer has been placed.
Figure 5B:
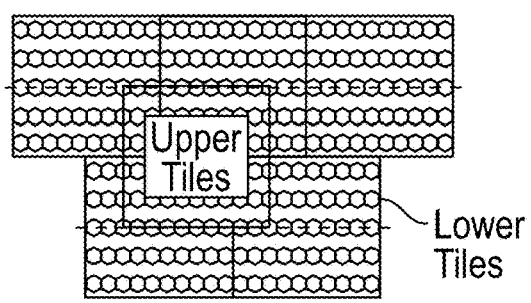
FIG. 5B shows the at portion of FIG. 5A with the upper layer of tiles being transparent.
Figure 5C:
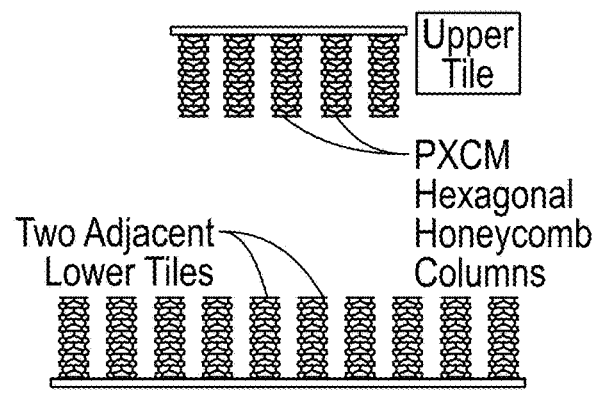
FIG. 5C is an exploded front elevation view of FIG. 5A.
Figure 5D:
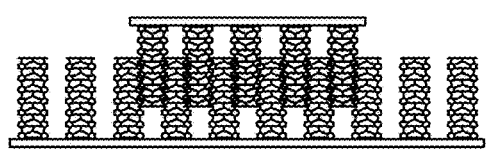
FIG. 5D is a partially exploded front elevation view of FIG. 5A.
Figure 5E:
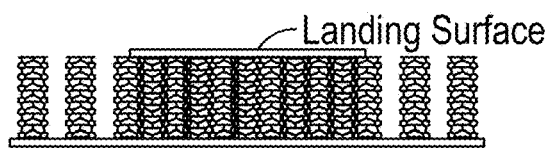
FIG. 5E is a front elevation view of FIG. 5A.

When fully assembled, panels consist of a lower layer of tiles and an upper layer of tiles. Each tile will consist of a base plate and a series of PXCM Hexagonal Columns (FIG. 5C). Similar to the known AM2 system, the lower layer of tiles will be laid in a brickwork configuration (FIGS. 5A, 5B). The upper layer of tiles are assembled such that the PXCM Columns of the upper tile interlock with the corresponding PXCM Columns of the lower tiles. It should be recognized that multiple tiles would compose a panel of the same size as an AM2 panel. The upper tiles will lock adjacent lower tiles into place (overlapping seams) in a brickwork configuration (FIGS. 5C-5E). The resulting assembly distributes both compressive and transverse (shear) loads generated by landing impact, hard braking, and slow turns associated with taxiing aircraft.

Dogbone coupons of 316 stainless steel were printed for material characterization experiments via quasi-static tensile tests under displacement control to fracture. The dogbones were printed in varying orientations to determine which orientation produced the highest ultimate strength (i.e., tensile stress required to fracture the sample). These material characterizations were considered when modeling the PXCM honeycomb tiles computationally. Additionally, PXCM honeycomb tile samples were printed using 17-4 stainless steel; however, no dogbones were printed to characterize the printed 17-4 material as it has been previously shown to demonstrate properties similar to that of traditionally produced wrought 17-4 stainless materials.

Simulations for each of the PXCM honeycomb tiles were conducted to understand the distribution of stresses throughout the designs and help the design process to select the correct PXCM parameters to avoid permanent damage of the mats under the loads required by the project. Finite element analysis (FEA) software was employed to carry out all of the simulations conducted for this project. For the sake of time, only quasistatic simulations were explored using a dynamic implicit solver to properly capture the structural behavior of the material.

At the time of touchdown, the landing tires of an aircraft contact the airfield matting. At this time, the tires deflect vertically due to the reaction force exerted on them by the airfield matting. When this force exceeds the preload present in the shock absorbers, the shocks will begin to deflect, converting part of the energy of impact to heat. After contact between the aircraft tires and the airfield matting, the tires will skid along the runway with a frictional force proportional to the varying coefficient of friction, which acts as a shear load imposed along the top surface of the airfield matting (FIG. 5E). After a short period, the tires will begin to roll, which can result in phenomena known as spin-up or spring-back, which can introduce severe dynamic effects. Thus, the forces exerted by the aircraft on the airfield matting are complex and difficult to model. The target compressive and shear loads are the loads that the ePXCM tile design is required to sustain before the onset of plastic deformation.

The static weight of an F-15 aircraft is approximately 30,000-45,000 lbs, in addition to approximately 25,000-35,000 lbs worth of payload. Thus, the maximum weight ranges around 80000 lbs, which is equivalent to a downward gravitational force of approximately 360 kN. It is this maximum weight load that is considered for the target vertical compressive load. For modeling, this is considered to be the target load required per hexagonal PXCM column that comprises each of the honeycomb tiles that make up the matting technology. The F-15 Eagle initially lands on two tires about 36 inches in diameter, with a section width of 11 inches, and a rim diameter of 18 inches. A tire of this size, under normal deflection (~32%) will have a contact patch that covers a 9.24-inch×19.2-inch (234-mm×487-mm) space on the airfield matting. Thus, at any point in time during takeoff or landing, one of the F-15 tires will cover two tiles. For this analysis, we assumed that each of the tiles contain approximately 23 hexagonal PXCM columns. If the F-15 exerts a static load of 360 kN (max payload included) on the ground, each of its wheels during landing exerts approximately half of this load (assuming an ideal and perfect landing) on two tiles composing the airfield matting. To specify, each tire would exert a load of 180 kN on two tiles; 90 kN on one tile. Finally, if there are 23 hexagonal PXCM columns per tile (3 rows of 5 and 2 rows of 4), then the required load per hexagon comes to approximately 3.9 kN (rounded up to 4 kN). The minimum compressive load estimated for each of the hexagonal PXCM columns on each tile to sustain before the onset of plastic deformation is 4 kN.

To obtain an approximate shear load, we consider the velocity of the hard-breaking truck. Here, it is expected that the PXCM airfield matting survive the load exerted by a half ton truck hard breaking from a velocity of 30 mph. For this approximation, it is assumed that a body traveling at a higher velocity of 50 mph (22.3 m/s) along the top surface of the tiles that will compose the PXCM airfield matting. Here we assume that this body weighs as much as the truck (~0.5 T or 499.6 kg). It is also assumed that this body (the landing tire of the aircraft) is made of rubber, which has a coefficient of static friction of μs=0.8 and coefficient of kinetic friction of μk=0.76 when in contact with steel (Note: the choice to use steel as the base material of the ePXCM tile design is detailed below). The frictional force that slows the body down is given as the following:

$$F\text{friction}=\mu kN \tag{1}$$

where N is the normal force exerted on the body by the ground. A body weighing 0.5 T exerts a static downward load on the ground of 4.98 kN, which is also the magnitude of N. Thus, the frictional force between the rubber body and the steel landing surface of the PXCM airfield matting is approximately 3.72 kN (rounded up to 4 kN for safety). 4 kN is the minimum shear load estimated for each of the hexagonal PXCM columns on each tile to sustain before the onset of plastic deformation.

Figure 6:
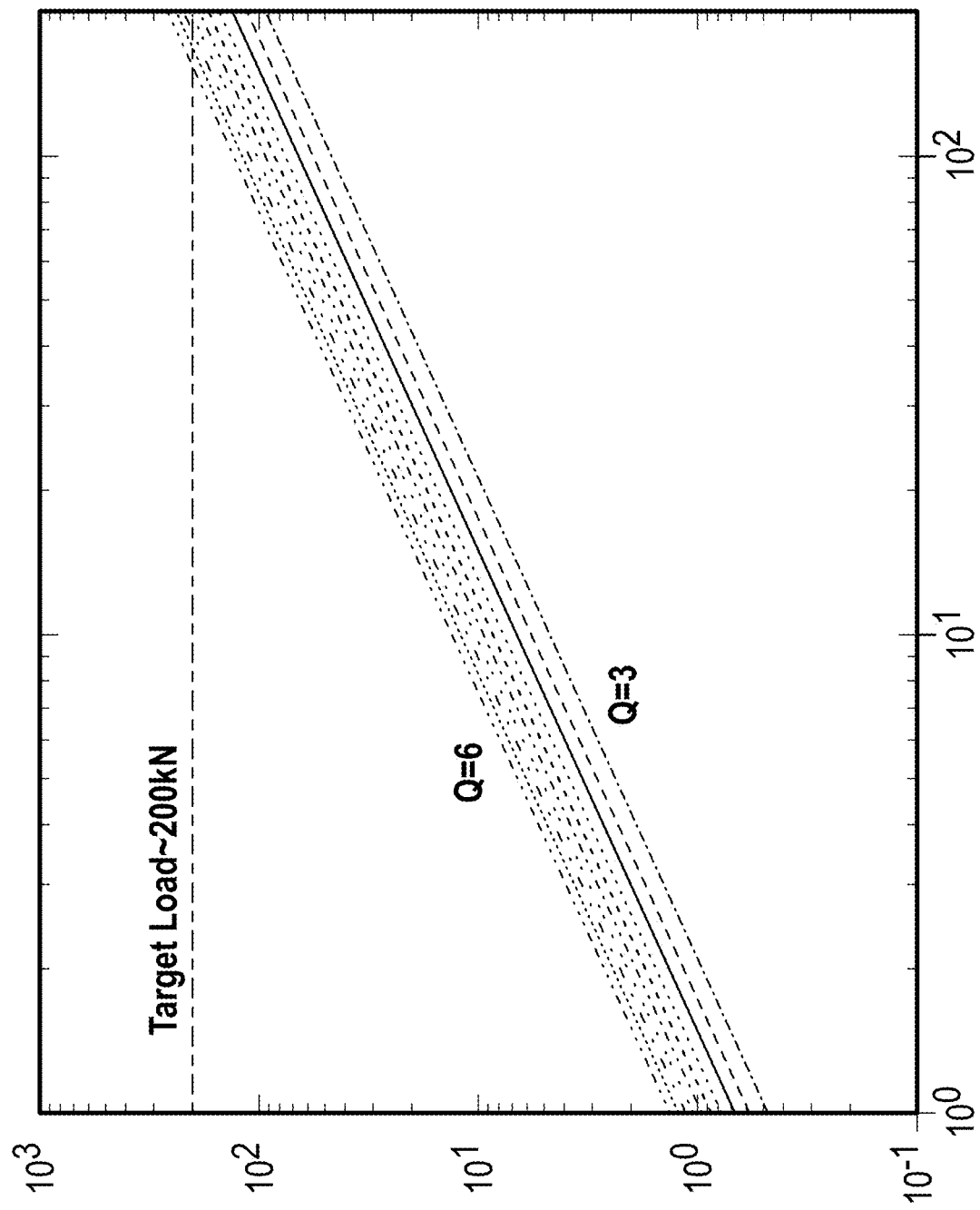
FIG. 6 graphically illustrates peak load as a function of Young's modulus for PSCM unit cells of different Q values.

In concert with simulation and experimental work, the base material, from which the new ePXCM tile design would be printed had to be explored. To do this, we first considered the mechanics of the PXCM detailed above in Section 2.2 and the compressive load due to the static weight of an F-15 aircraft. For the initial design of the PXCM matting technology, we chose to use a target load of 45,000 lbs or 200 kN. Here the target load is the maximum load that the PXCM matting technology would have to withstand before the onset of plastic deformation. FIG. 6 below shows a design map for the PXCM unit cell in which the peak load of the PXCM unit cell is plotted against the Young's modulus of the composed base material. Note here that the peak load was plotted against Young's modulus, E, ranging from 20 GPa for most polymeric materials to 200 GPa, which is characteristic of steel. Additionally, PXCMs with a Q between 3 and 6 (ranging from metastable to bistable) were considered for this plot as well. Each curve in the plot represents the peak load-vs-Young's modulus curve for a PXCM unit cell with a different mechanism, Q. The peak load of a PXCM unit cell as a function of Young's modulus (for a mechanism of $3<Q\leq 6$) is given by the expression below:

$$F\text{peak}=(10.644Q^3-161.75Q^2+858.42Q-873.1)\times E\pi 2\pi 3\lambda 2\pi 1412 \tag{2}$$

where the variables π1-3 are dimensionless groups that define the geometry of the PXCM unit cell and are given by the following expressions:

$$\pi 1 = t\lambda/ \tag{3}$$

$$\pi 2 = A\lambda/ \tag{4}$$

$$\pi 3 = bt/ \tag{5}$$

Curves are plotted for PXCMs ranging from a metastable mechanism (Q=3) to a bistable mechanism (Q=6). the region of the plot highlighted in yellow reveals the range of Young's moduli (and thus the range of base materials) that are required for PXCM unit cells to reach the target load.

It should be noted that the plots shown in FIG. 6 are based on a few assumptions. First, these plots do not consider plastic deformation in the PXCM unit cell. For some of these PXCMs made of steel, for example, plastic deformation may occur before the theoretical peak load is reached. Second, it is assumed that all of the load due to the static weight of the aircraft is exerted on a single row of 30 PXCM unit cells, which will not be the case in reality (in reality, there will be thousands of unit cells stacked next to each other to form the airfield matting). Third, the target load is based on the static weight of the F-15 and does not consider the added acceleration due to landing. The fundamental purpose of this design map was to obtain an understanding of the kinds of materials from which the ePXCM tile design should be fabricated. and whether or not this material was theoretically capable of reaching the target load. The design map shown in FIG. 6 identifies the following:

1) The PXCM would theoretically be able to withstand the static load due an F-15 aircraft if it were made of a material (having Young's modulus greater than 102 GPa) such as steel (~200 GPa). This is indicated by the region of the plot in FIG. 6 at which the peak load-vs-Young's modulus curves pass over the target load and,
2) multiple PXCM unit cells will be required to withstand the total load due to the weight of the aircraft.

Figure 7A:
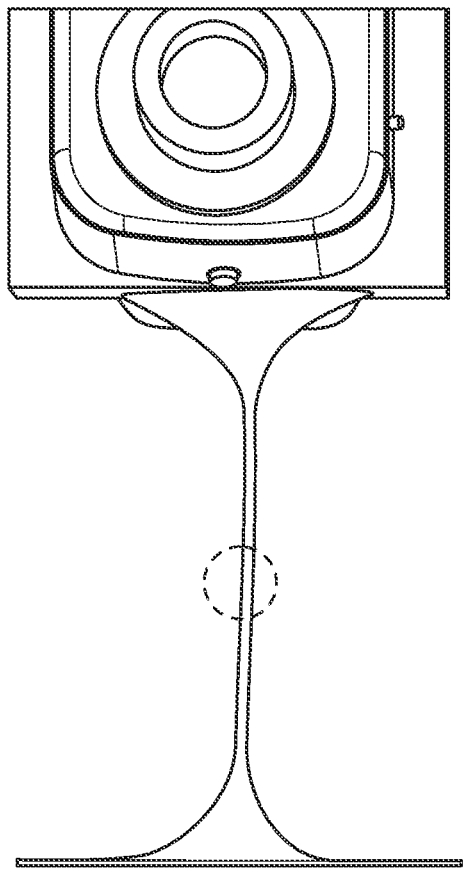
FIG. 7A is a front elevation view of a 0° dogbone member post failure after tensile loading.
Figure 7B:
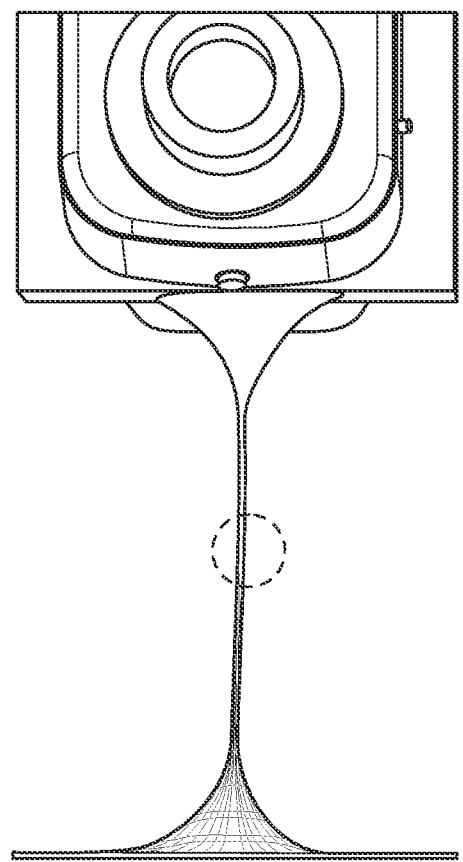
FIG. 7B is a front elevation view of a 45° dogbone member post failure after tensile loading.

Two steel alloys were selected for respective suitability of printing the concept structures: 316L vPro powder and traditional 17-4 stainless steel powder. The 316L steel alloy was used to construct several dogbone specimens to obtain the Young's modulus and the stress-strain curves. It was determined that 17-4 stainless steel would be used due to its superior material properties (mainly a higher yield strength) and resulting printing characteristics over the 316L vPro steel. The 316 L steel has a nominal Young's modulus of approximately 200 GPa and a yield strength of approximately 250 MPa. The dogbones were printed in two different orientations; 1) having the axis running along the length of the dogbone parallel to that of the direction in which the recoater blade moved during printing (these were labeled the 0-Degree Dog Bones), and 2) oriented with the axis running along the length of the done bone at a 45° angle relative to the direction of the moving recoater blade (these were labeled the 45-Degree Dog Bones). The dogbones and the results of the tensile experiments are shown in FIG. 7. However, these experiments yielded a Young's modulus of 316L 3D printed steel that was between 3 and 6 times smaller than the expected Young's modulus of 200 GPa. Tables 1 and 2 give Young's modulus (GPa), Yield Strength (MPa) and Yield Strain (%) for each of the 0° and 45° samples, respectively.

TABLE 1

0° Dogbone Printing Orientation

| Test | Modulus (GPa) | Yield Strength (MPa) | Yield Strain (%) |
|---|---|---|---|
| 1 | 33.72 | 328.75 | 1.17 |
| 2 | 52.61 | 303.39 | 0.776 |
| 3 | 64.48 | 371.86 | 0.776 |

TABLE 2

45° Dogbone Printing Orientation

| Test | Modulus (GPa) | Yield Strength (MPa) | Yield Strain (%) |
|---|---|---|---|
| 1 | 53.93 | 245.18 | 0.73 |
| 2 | 55.35 | 300.43 | 0.84 |
| 3 | 50.87 | 307.99 | 0.87 |

This, combined with significant print resolution and defect issues, resulted in the selection of the 17-4 material for the balance of the development process. Additionally, these experiments revealed that printing the dogbones such that the axis running along the gauge length, (0° orientation) yielded samples with a higher yield strength and strain.

In addition to setting a target load and choosing a base material, the total mass (weight) of the material in the ePXCM tile design must be controlled. The target for a runway mat is a weight of no more than 3.5 lbs/ft². Note that each tile is composed of a base plate and a series of hexagonal PXCM columns. Assuming a base of thickness 2 mm, the total volume of the base plate would be vo/base-plate=250×250×2 mm3=125000 mm³=4.41×10⁻³ ft³. The density of the 3D-printed steel was assumed to be ρsteel=7750 kgm³=219.4556 kgft³=483.816 lbsft³

Thus, the total mass of a base plate would be massbase plate=ρsteel×volbase plate=0.9678 kg=2.133 lbs However, it should be noted that in a square foot of the ePXCM tile design there will typically be two base plates, due to the fact that individual tiles will be assembled opposing each other. Thus, the mass of the base plates would be 4.27 lbs. Now the maximum allowable mass in the 250×250 mm² area of the base plates for military use is 2.35 lbs.

Figure 8:
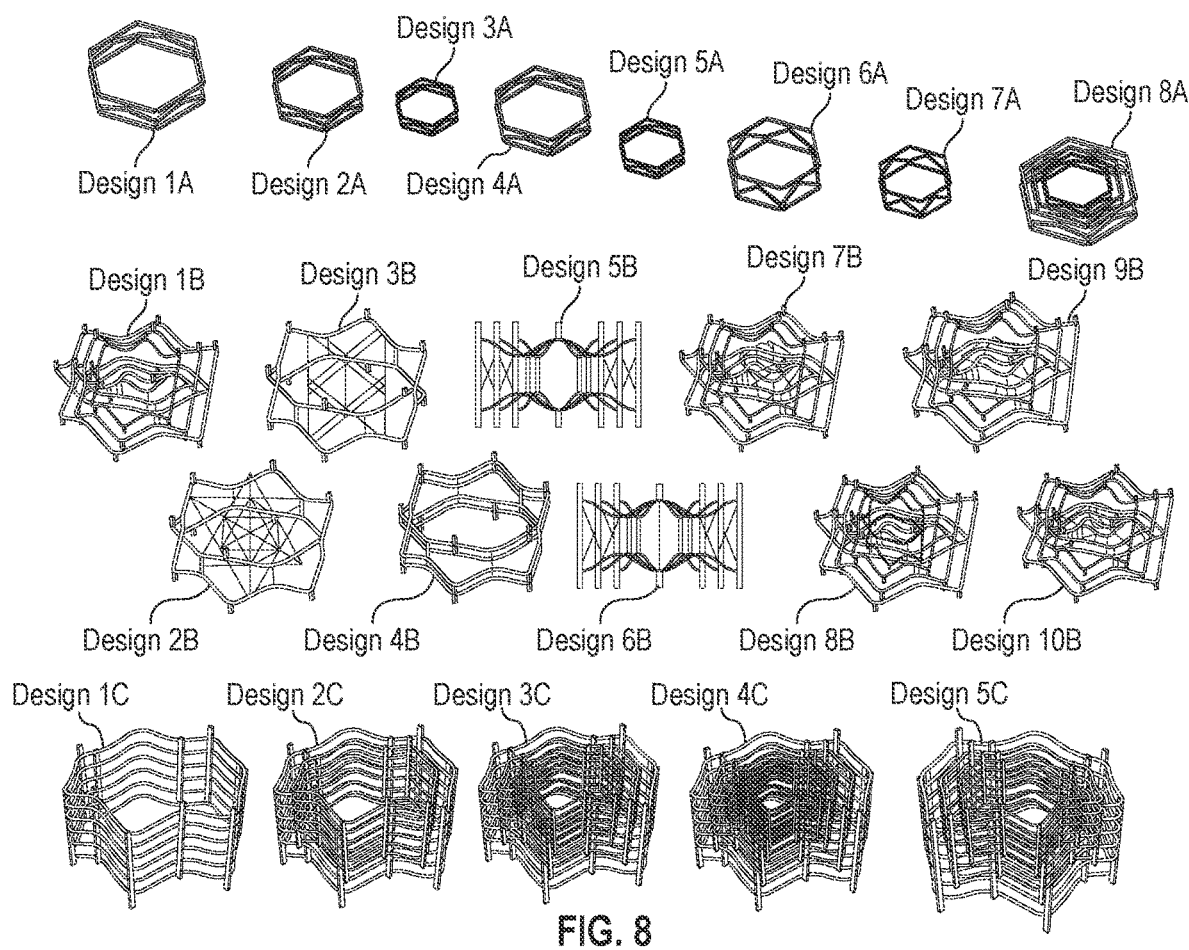
FIG. 8 is a perspective view of a plurality of hexagonal PXCM column configurations.

Finite element analysis used to simulate hexagonal PXCM columns subject to both compressive and shear loading, to obtain the corresponding yield loads under compression and shear for each model. For all simulations, 3D SR4 shell elements were used to model each of the designs that were developed. All simulations were run quasi-statically under displacement control using a dynamic implicit solver. FIG. 8 shows all designs that were considered and simulated under both compressive and shear loading during the development of the ePXCM tile design. Dimensions for each of the designs are shown below (Table 3).

There are three sets (A, B, C) of design embodiments explored herein. Set A includes designs that utilize horizontal walls. Set B utilizes an inverted wave-hex pattern. The horizontal walls are replaced with an inverted sinusoidal beam to improve the ease of printing. Set C includes designs with stacked sinusoidal beams for increased stiffness (and strength) of the PXCM honeycomb columns.

TABLE 3

Design Parameters for the Hexagonal PXCM Columns

| Design | Amplitude (mm) | Thickness (mm) | Wavelength (mm) | Depth (mm) |
|---|---|---|---|---|
| 1A | 3 | 1 | 18 | 1.45 |
| 2A | 2.25 | 0.75 | 13.785 | 1.0875 |
| 3A | 1.5 | 0.5 | 9.25 | 0.725 |
| 4A | 2.25 | 1 | 13.785 | 1.45 |

TABLE 3-continued

Design Parameters for the Hexagonal PXCM Columns

| Design | Amplitude (mm) | Thickness (mm) | Wavelength (mm) | Depth (mm) |
|---|---|---|---|---|
| 5A | 1.5 | 1 | 9.25 | 1.45 |
| 6A | 3 | 1 | 13.875 | 1.45 |
| 7A | 3 | 1 | 9.25 | 1.45 |
| 8A | 3 | 1 | 18, 13.875, 9.25 | 1.45 |
| 1B | 3 | 1 | 18, 13.875, 9.25 | 1.45 |
| 2B | 3 | 1 | 18 | 1.45 |
| 3B | 3 | 1 | 18 | 1.45 |
| 4B | 3 | 1 | 18 | 1.45 |
| 5B | 3 | 1 | 18 | 1.45 |
| 6B | 3 | 1 | 18 | 1.45 |
| 7B | 3 | 1 | 18 | 1.45 |
| 8B | 3 | 1 | 18, 13.875, 9.25 | 1.45 |
| 9B | 3 | 1 | 18 | 1.45 |
| 10B | 3 | 1 | 18 | 1.45 |
| 1C | 3 | 1 | 18 | 1.45 |
| 2C | 3 | 1 | 18, 13.875 | 1.45 |
| 3C | 3 | 1 | 18, 13.875, 9.25 | 1.45 |
| 4C | 3 | 1 | 18, 13.875, 9.25 | 1.45 |
| 5C | 3 | 1 | 18, 13.875, 9.25 | 1.45 |

Table 3: Design Parameters for the Hexagonal PXCM Columns

FIGS. 9A-B below highlight the results of vertical compressive loading for each of the Set A designs. These simulations were run for 1000 ms of time and were compressed at a rate of 5×10⁻⁴ mm/ms to achieve a displacement of 0.5 mm. Roller boundary conditions were used for each of these simulations, which constrained any other translation or rotation other than in the direction in which the velocity was applied (negative y direction). Additionally, the Von Mises stresses were used to determine the load required to induce plastic deformation in each of the models. The load-displacement curves, the yield loads (kN) and the mass per hexagonal PXCM column. None of the designs in Set A was able to sustain the required compressive load (~4 kN) before the onset of plastic deformation as indicated by the yield loads shown in FIG. 9B.

TABLE 4

Yield Shear Loads Set A

| Design | Yield Load, X-Shear (kN) | Yield Load, Z-Shear (kN) |
|---|---|---|
| 1A | 0.100 | 0.100 |
| 2A | 0.160 | 0.193 |
| 3A | 0.875 | 0.800 |
| 4A | 0.482 | 0.413 |
| 5A | 0.700 | 0.630 |
| 6A | 0.473 | 0.393 |
| 7A | 4.866 | 0.393 |
| 8A | 2.450 | 1.040 |

Mass was approximated for each design as these embodiments are made of 3D shell elements and are not solid. Table 4 highlights the results of the shear loading simulations for Design Set A. There were two different shear loading orientations that were simulated for each of the designs in Set A: (1) Shear loading applied along the top surface of the PXCM hexagonal columns in the x direction and (2) Shear loading applied along the top surface of the PXCM hexagonal columns in the z direction.

To increase the ease of 3D printing the PXCM hexagonal columns, the horizontal walls in design Set A were replaced with an inverted sinusoidal beam for design Set B. Only vertical compression simulations were conducted on the designs in Set B, so that a design could sustain the target 4 kN before the onset of plastic deformation under compression. The finite element simulations (compression) for designs in Set B ran for 1000 ms and were compressed at a rate of $5\times10^{-4}$ mm/ms to achieve a displacement of 0.5 mm. Roller boundary conditions were used for each of the simulations, constraining all other translation or rotation to the direction in which the velocity was applied (negative y direction, FIG. 8). Additionally, the Von Mises stresses were used to determine the load required to induce plastic deformation in each of the models. FIGS. 10A-10B highlight the results of vertical compressive loading for each Set B design. Note that 3 designs (highlighted yellow in FIG. 10B) sustain 4 kN, by the Von Mieses criterion, before the Onset of Plastic Deformation. For 23 Hexagonal PXCM Columns per tile (3 Rows of 5, 2 Rows of 4) each of the masses falls under the leftover for a tile with an aluminum baseplate. Masses shown with a>fall close to another design's approximate mass.

FIG. 10A compares the load-displacement curves under compression up to 0.1 mm (to capture initial stiffness) with that of Design 8A, which was the stiffest of the designs in Set A. Of the designs in Set B, Design 2B, 6B, and 8B were able to sustain a load greater than the target 4 kN before the Von Mises criterion predicted the onset of plastic deformation in the models. Again, it should be noted that these masses approximate the actual masses for each design as these models are made of 3D shell elements and are not solid. Many of the designs in Set B were still experiencing failures during printing due to the lack of unsupported material under the inverted sinusoidal beams.

Figures 11A, 11B:
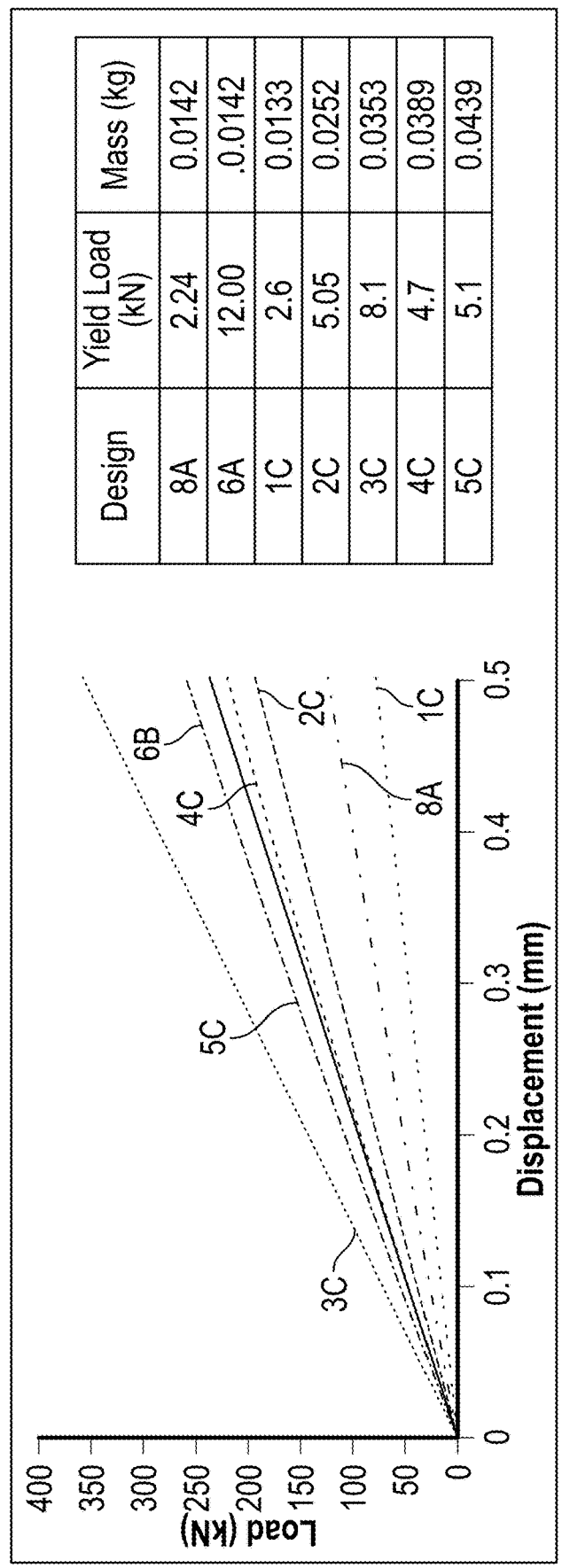
FIG. 11A graphically illustrates load as a function of displacement for each design in Set C.
FIG. 11B is a tabular illustration of yield loads and mass for each PXCM column of FIG. 11A.
Figure 12A:
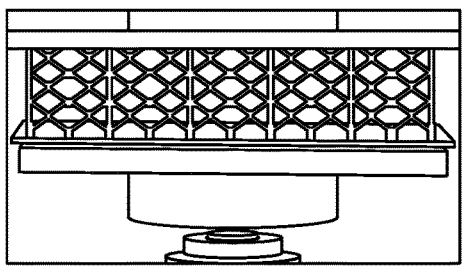
FIG. 12A is a front plan view of a portion of a stainless steel PXCM mat compression loaded at 1 mm/min at the 0-minute mark.
Figure 12B:
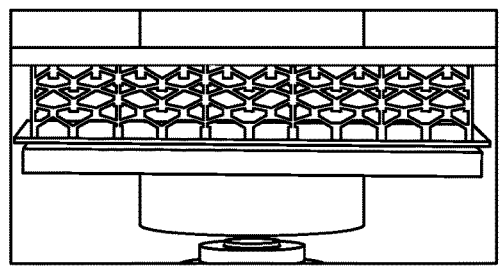
FIG. 12B is a front plan view of a portion of a stainless steel PXCM mat compression loaded at 1 mm/min at the 7-minute mark.
Figure 12C:
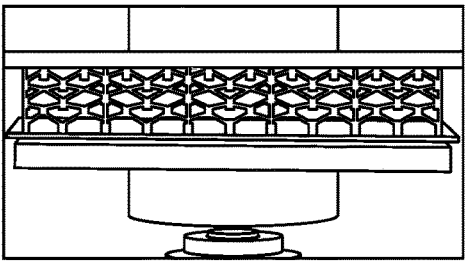
FIG. 12C is a front plan view of a portion of a stainless steel PXCM mat compression loaded at 1 mm/min at the 13-minute mark.
Figure 12D:
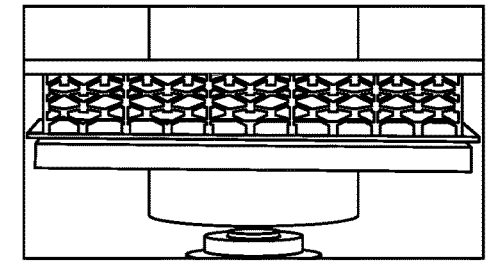
FIG. 12D is a front plan view of a portion of a stainless steel PXCM mat compression loaded at 1 mm/min at the 20-minute mark.
Figure 12E:
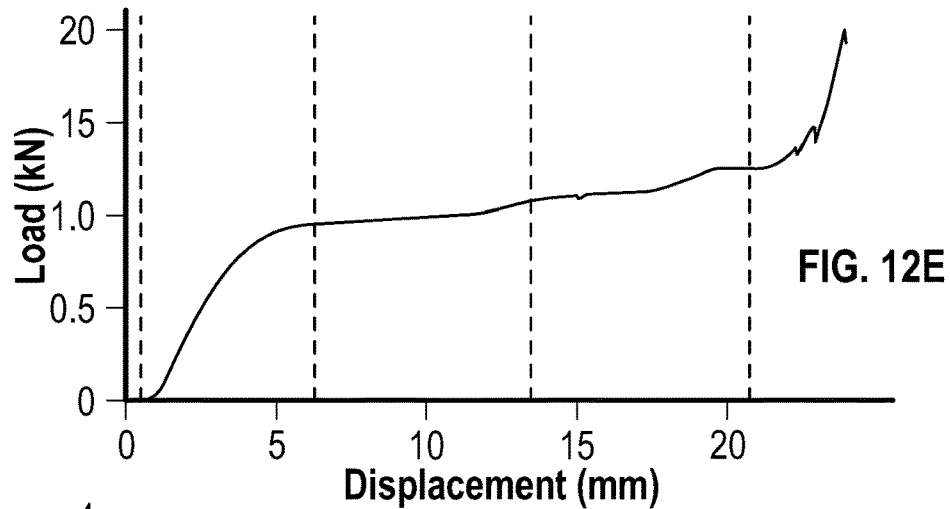
FIG. 12E graphically illustrates load as a displacement as a function of load for FIGS. 12A-12D.
Figure 12F:
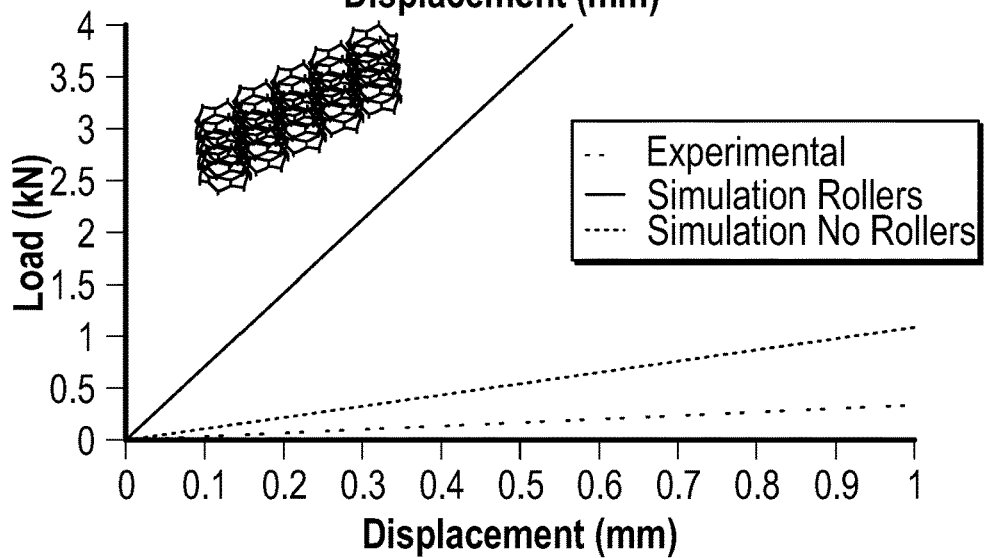
FIG. 12F graphically illustrates load as a displacement as a function of load for FIGS. 12A-12D as determined experimentally and under simulated conditions.

To further increase the ease of printing the hexagonal PXCM columns, sinusoidal beams were stacked on top of each other as shown the Set C designs in FIG. 8. Both vertical compression and shear simulations were conducted on the designs in Set C. All finite element simulations of the designs in Set C were run for 1000 ms of simulation time and were compressed at a rate of 5×10-4 mm/ms to achieve a displacement of 0.5 mm. Roller boundary conditions were used for each of these simulations, which constrained any translation or rotation other than in the direction in which the velocity was applied (negative y direction, FIG. 8). The Von Mises stresses were used to determine the load required to induce plastic deformation in each of the models. FIGS. 11A-11B highlights the results of vertical compressive loading for each of the Set C designs.

Note that four set C designs were able to sustain 4 kN, by the Von Mises criterion, before the onset of plastic deformation. Designs 2C, 3C, 4C, and 5C for 23 hexagonal PXCM columns per tile (3 rows of 5, 2 rows of 4) would exceed the weight limit for a tile with an aluminum baseplate.

FIG. 11Aa compares the load-displacement curves under compression up to 0.5 mm with that of Designs 8A and 6B, the stiffest of the designs in Set A and B, respectively. Of the designs in Set C, Design 2C, 3C, 4C, and 5C were able to sustain a load greater than the target 4 kN before the Von Mises predicted the onset of plastic deformation in the models. Again, however, it is important to note that these masses approximate the actual masses for each design as these models are made of 3D shell elements and are not solid. As the number of stacked sinusoidal beams is reduced the vertical distance between each beam, when evenly distributed, increase and appears to contribute negatively to thermal distortion effects in the central vertical member connecting the apex of each sinusoidal beam. It is also important to note that Designs 4C and 5C are loaded without roller constraints, meaning that translations away from the direction of compression and rotations were allowed and yet still, these designs were able to surpass the target yield load of 4 kN.

Table 5 highlights the results of the shear loading simulations for Design Set C. The same two different shear loading orientations that were simulated for each of the designs in Set A were also simulated for each of the designs in Set C: (1) Shear loading applied along the top surface of the PXCM hexagonal columns in the x direction and (2) Shear loading applied along the top surface of the PXCM hexagonal columns in the z direction. None of the designs in Set C were able to sustain a load greater than the target 4 kN before the Von Mises predicted the onset of plastic deformation in the models.

TABLE 5

Set C Yield Shear Loads

| Design | Yield Load, X-Shear (kN) | Yield Load, Z-Shear (kN) |
|---|---|---|
| 1C | 0.260 | 0.230 |
| 2C | 0.535 | 0.550 |
| 3C | 0.880 | 1.260 |
| 4C | 1.26 | 1.21 |
| 5C | 1.79 | 1.97 |

Figure 13F:
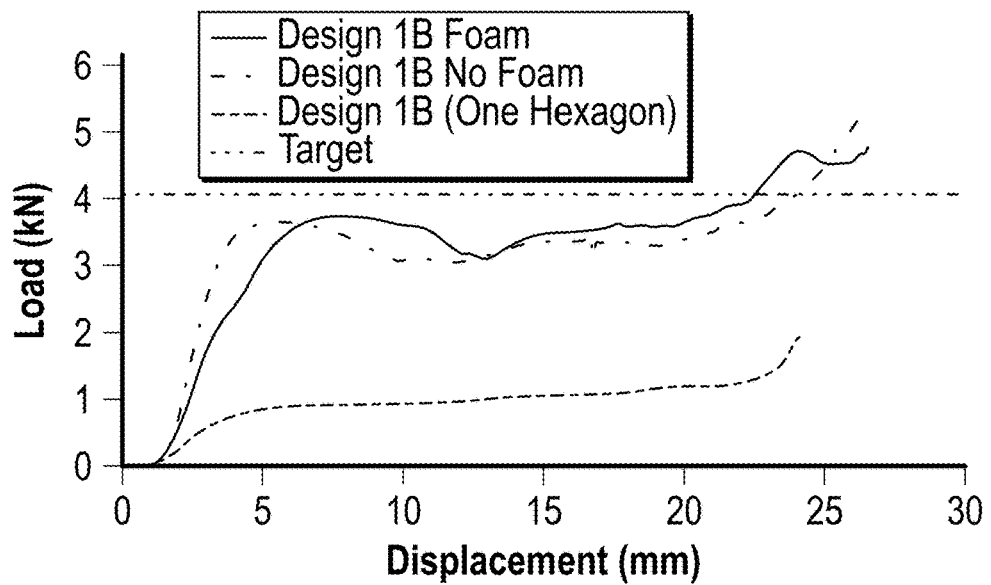
FIG. 13F graphically illustrates load as a displacement as a function of load for a hexagonal PXCM mat with and without foam infiltration.

The next samples to print successfully were of Design 1B with all Three concentric hexagons. Two samples were prepared, one with and one without a foam injected into the open spaces of the hexagonal PXCM. The foam sample consisted of one tile with one row of 5 and one row of 4 hexagonal PXCM columns of Design 1B. The sample without foam consisted of two tiles each with one row of 5 and one row of 4 hexagonal PXCM columns of Design 1B. It is important to note that for the sample without foam, the rows of 5 had 2 concentric hexagons per column where the rows of 4 have only 1 hexagon per column. This was done to ensure that the two tiles would a) lock together when assembled, and b) in an effort to reduce print failure due and mitigate thermal concentration within the center hexagonal columns. These experimental samples (shown in FIG. 13) were loaded under compression at 1 mm/min in a MTS Insight machine with a 300-kN load cell for 25 min. FIG. 13F compares the load-displacement relationships of the three concentric hexagons per column Design 1B experimental samples with that of the 1 hexagon per column 1B as well as the target compressive load of 4 kN. The addition of a foam to the steel hexagonal PXMC columns does not impact the response, suggesting that foams such as these could be used to aid with the locking of tiles into place in an actual airstrip.

Figure 14A:
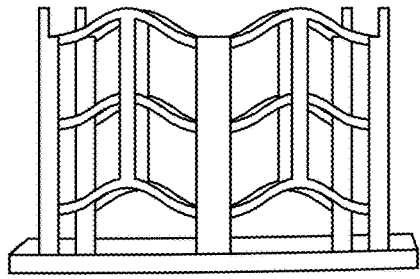
FIGS. 14A-14E are elevation views of PXCM columns of Set C.
Figure 14B:
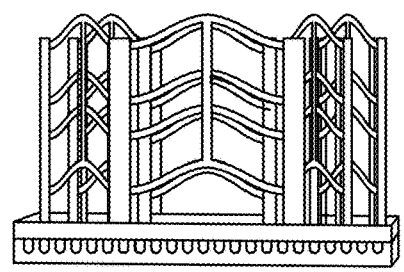
Figure 14C:
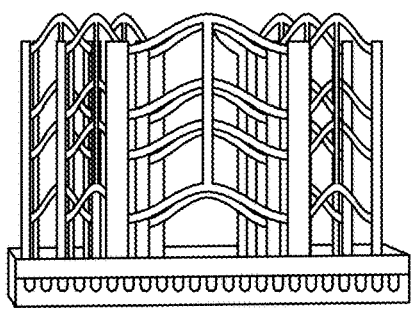
Figure 14D:
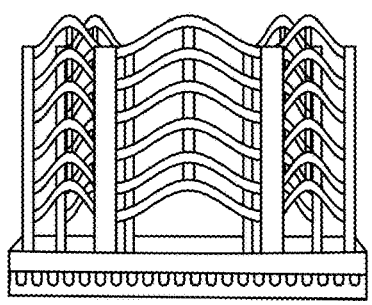
Figure 14E:
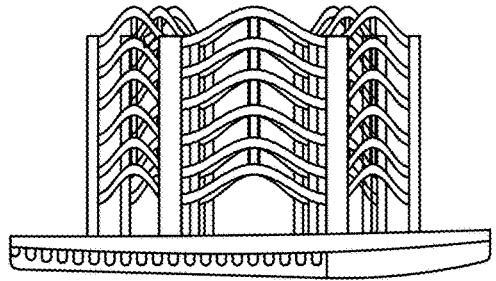

Each of the designs shown in FIG. 14A-14E was loaded in two different MTS machines (one with a 10-kN load cell and one with a 300-kN load cell). The only difference between the designs shown in FIGS. 14A-14C are the number of stacked sinusoidal beams used in the design. The designs shown in FIGS. 14A, 14B, and 14D have two concentric hexagons whereas the designs shown in FIGS. 14C and 14E have three concentric hexagons. The silver material on the bottom of the samples shown in FIGS. 14B-14E is the support material, which was removed in later iterations. Hereinafter, the designs in FIG. 14A-14E will be referred to as the following respectively: Design 2C_3, Design 2C_4, Design 3C_4, Design 2C_6, Design 3C_6. The designs shown in FIG. 14 referred to as Design 2C have two concentric hexagons, Design 3C have three concentric hexagons. The number following the design designation refers to the number of stacked sinusoidal beams in the design.

Figure 15A:
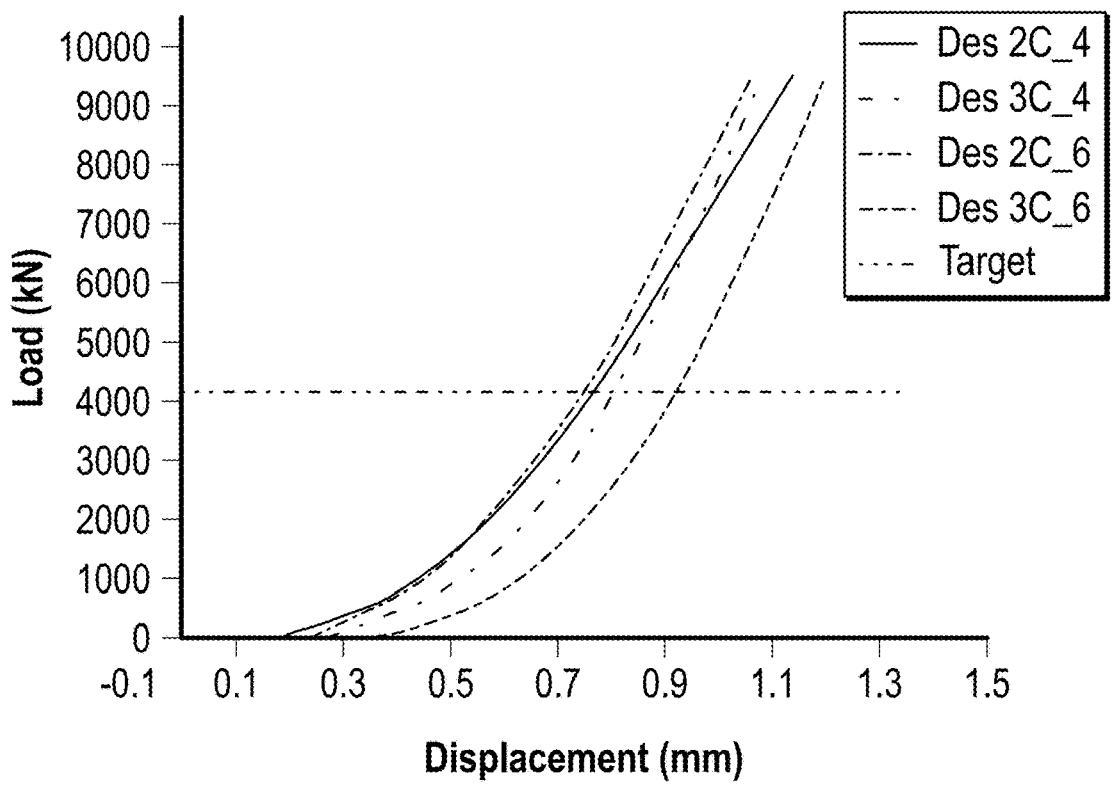
FIG. 15A graphically illustrates displacement as a function of 10 kN load for various PXCM column designs.
Figure 15B:
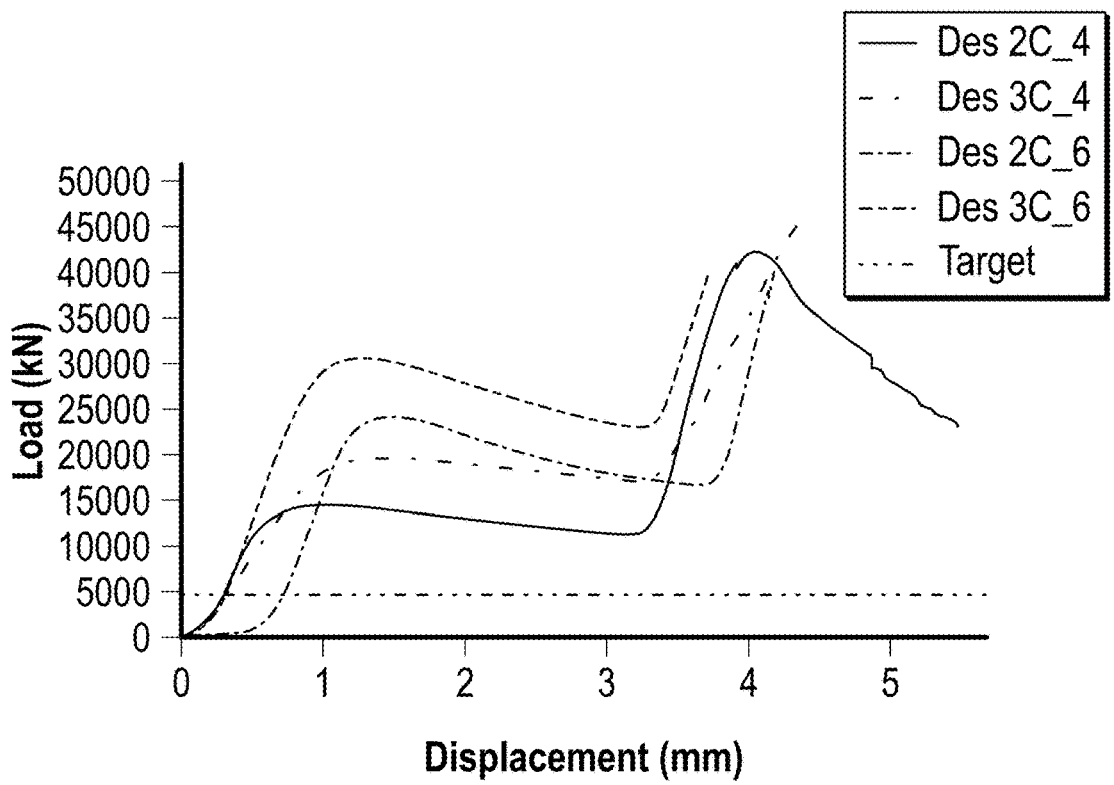
FIG. 15B graphically illustrates displacement as a function of 300 kN load for various PXCM column designs.

FIG. 15A-15B show load-displacement curves from both of the MTS machines that were used. FIG. 15A-15B shows load-displacement curves for Designs 2C_4, 2C_6, 3C_4, and 3C_6 extracted from an MTS machine using a 10-kN load cell and a 300-kN load cell. All of the designs were able to sustain a load anywhere between 3 to 7 times larger than the target load, which would then induce a softening in the structure. The softening of each of the designs under these loads can be seen in FIG. 14B where the stiffness (slope of the load-displacement curve) begins to decrease after being initially constant for the start of loading. As the weight of Designs 2C_6 and 3C_6 exceeded the maximum allowable weight per square foot, further tests were conducted on the 2C_3 and 2C_4 designs.

Figure 16A:
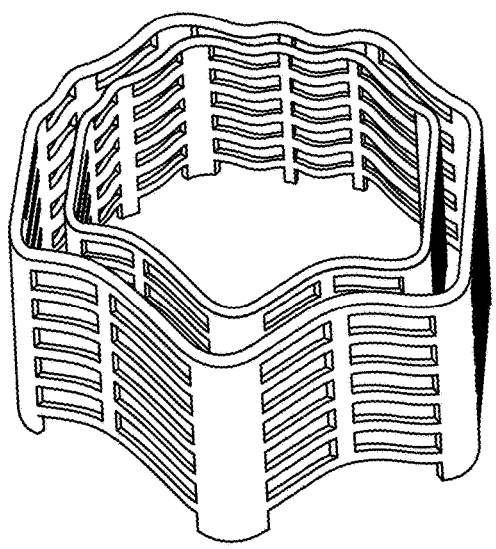
FIG. 16A is a first top perspective view of a first PXCM column of design 2c_3.
Figure 16B:
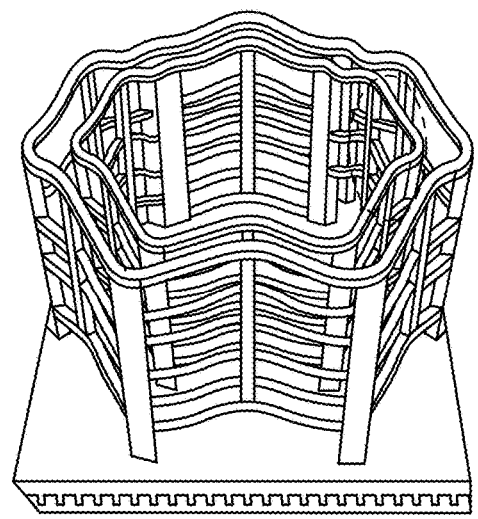
FIG. 16B is a first top perspective view of a second, damaged PXCM column of design 2c_3.
Figure 16C:
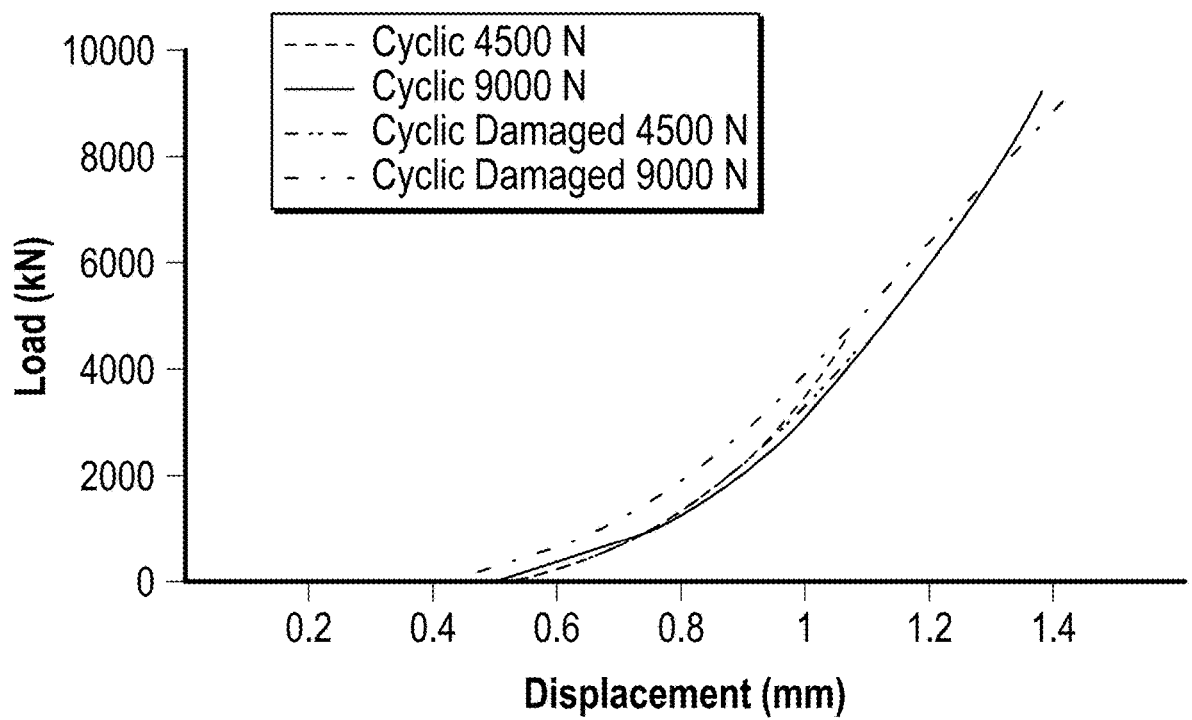
FIG. 16C graphically illustrates displacement as a function of cyclic loading for FIGS. 16A and 16B.

To determine if the samples were deforming plastically over time, several cyclic loading experiments were conducted on the 2C_3 and 2C_4 design specimens. Each sample was loaded for 10 cycles for each sample up to both 4500 N and 9000 N. FIG. 16A-16F show the results of those cyclic loading tests. The 2C_3 sample D shown in FIG. 16B has a visible printing defect encircled in red. The Design 2C_3 experimental sample shown in FIG. 16A is the only Design 2C_3 that printed successfully with no noticeable failures. FIG. 16C shows the cyclic loading/unloading curves for Design 2C_3 samples B and D up to 4500 N and up to 9000 N. No extreme deviations in the load-displacement curve for each loading and unloading cycle were observed for the 4500-N test and the 9000-N test.

Additionally, there is no noticeable difference between the load-displacement curves for the "perfect" 2C_3 sample B and the "damaged" 2C_3 sample D, suggesting that printing failures do not affect the load-displacement performance of the 2C_3 design. FIG. 16F shows the cyclic loading/unloading curves for the Design 2C_4 sample up to 4500 N and up to 9000 N. No extreme deviations in the load-displacement curve for each loading and unloading cycle were observed for the 4500-N test and the 9000-N test.

As an additional check for plastic deformation, the Design 2C_4 sample was loaded cyclically up to 4500 N for 9 consecutive hours and the peak load (i.e., the highest load felt by the sample each loading/unloading cycle) was plotted as a function of time. This is shown below in FIG. 17A where the peak-load versus loading cycle plot is compared to the target load of 4 kN.

Figure 17A:
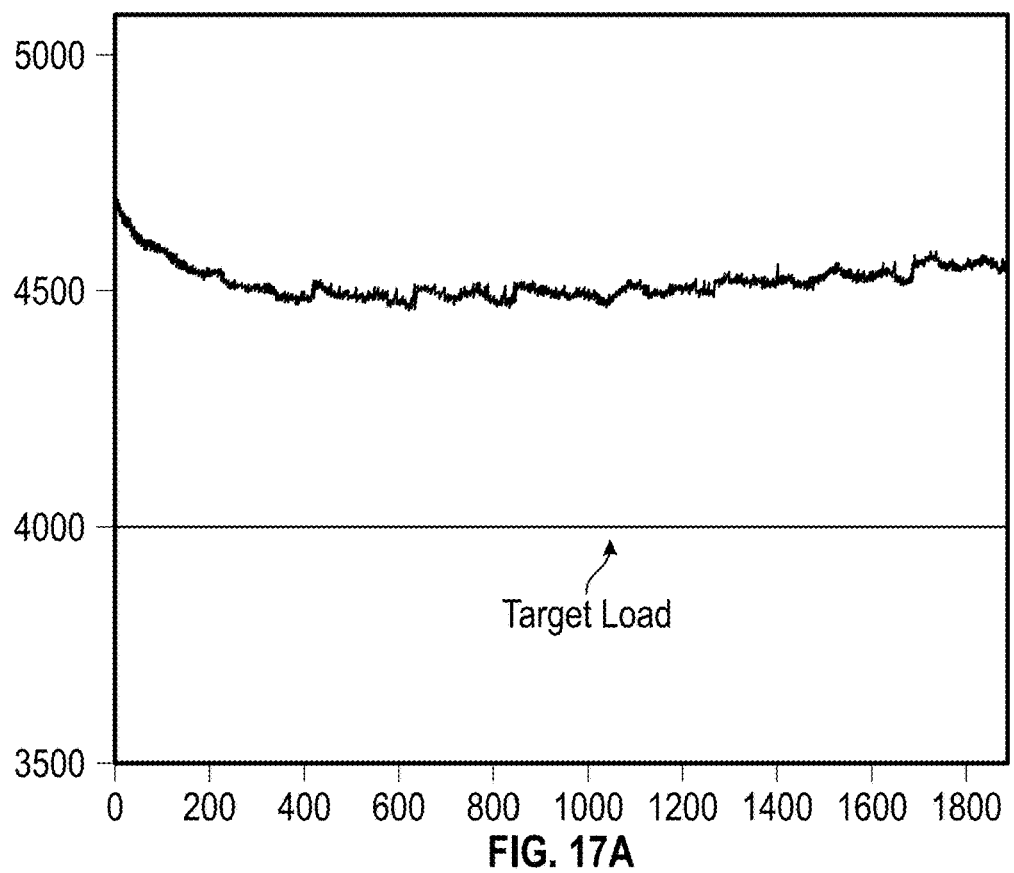
FIG. 17A graphically illustrates peak load as a function of cycle number for FIG. 16D.
Figure 17B:
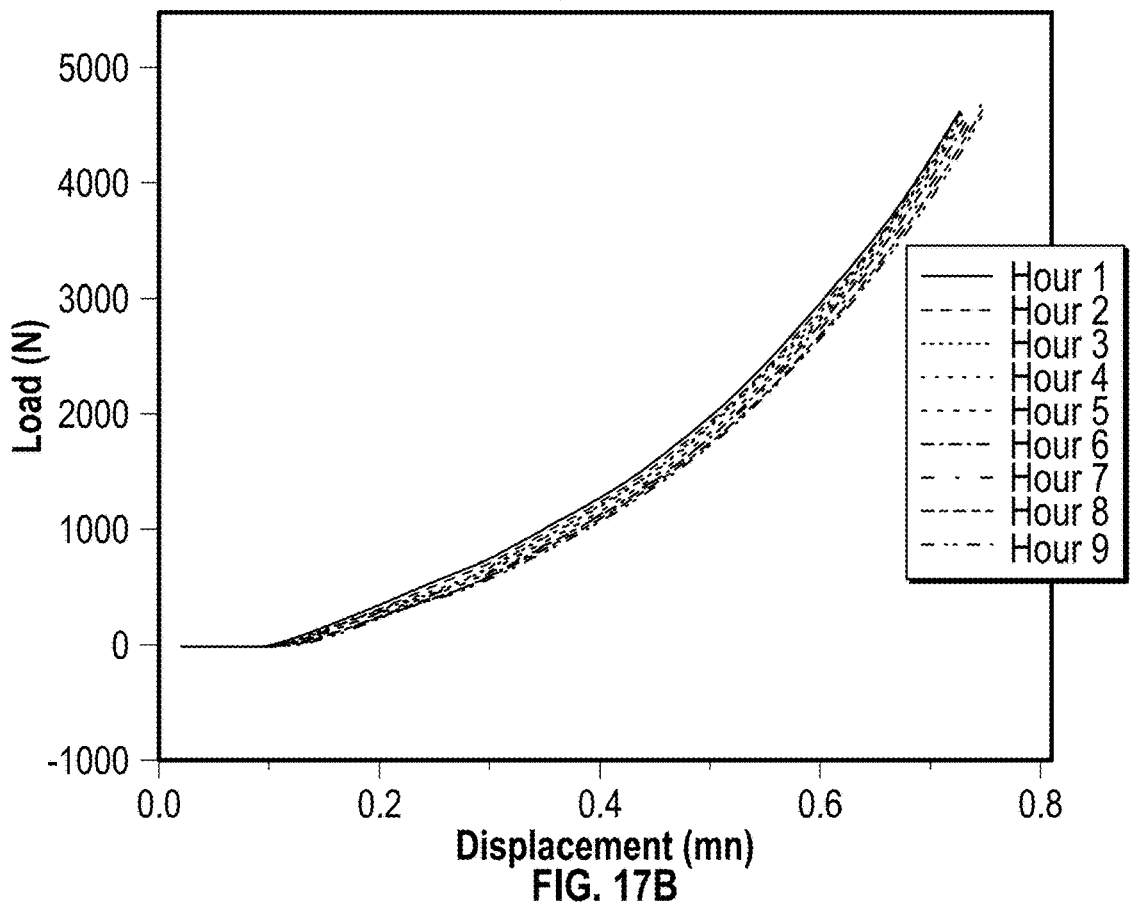
FIG. 17B graphically illustrates peak load as a function of displacement for FIG. 16D.

At the beginning of the cyclic testing, the Design 2C_4 sample had a higher peak load of approximately 4700 N, which decreased steadily to approximately 4500 N after about 400 loading cycles, where it remained for the rest of the 1900 loading-and-unloading cycles. This suggests an initial softening in the sample before hitting a plateau. However, significant plastic deformation is not observed as there is no significant drop in the peak load after about 400 loading/unloading cycles. FIG. 17B shows the cyclic load-displacement curves for each hour.

Figure 18A:
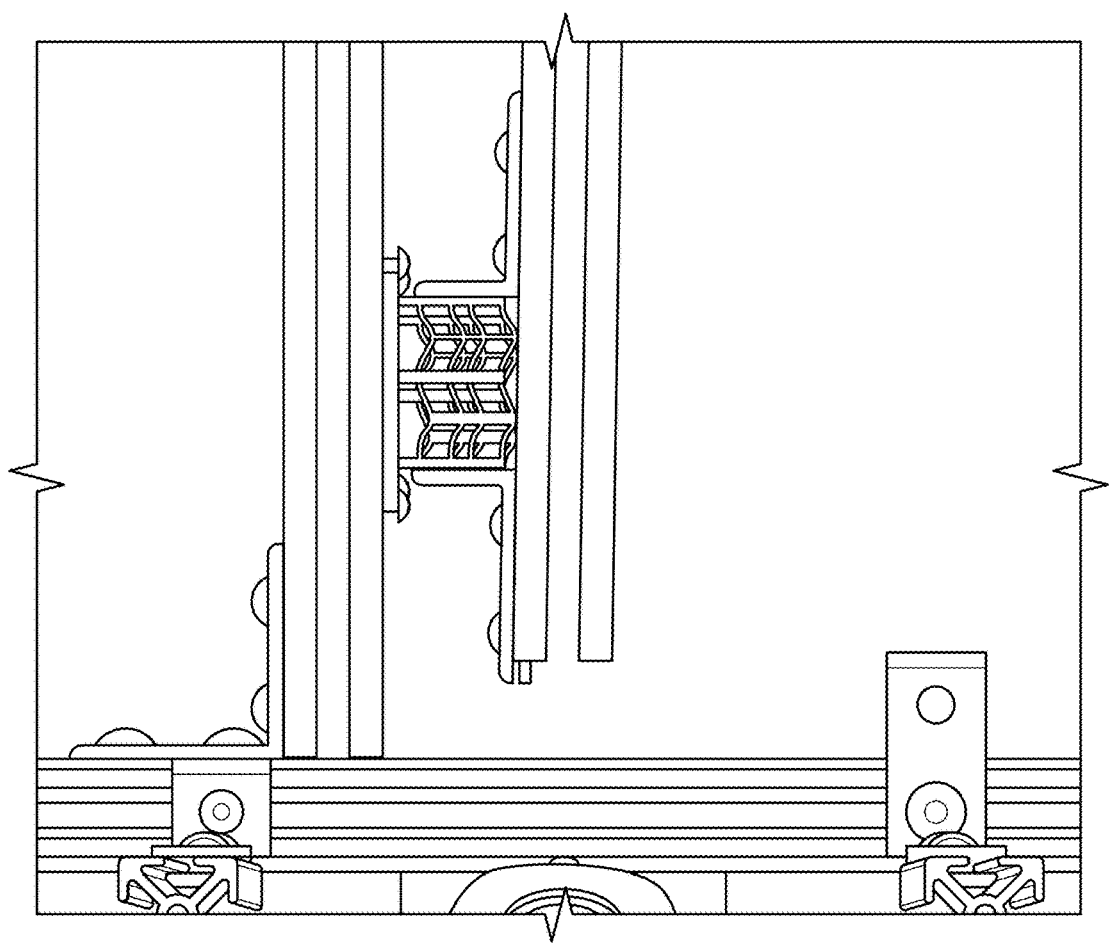
FIG. 18A is a plan view of a shear load testing set up for FIG. 16D.
Figure 18B:
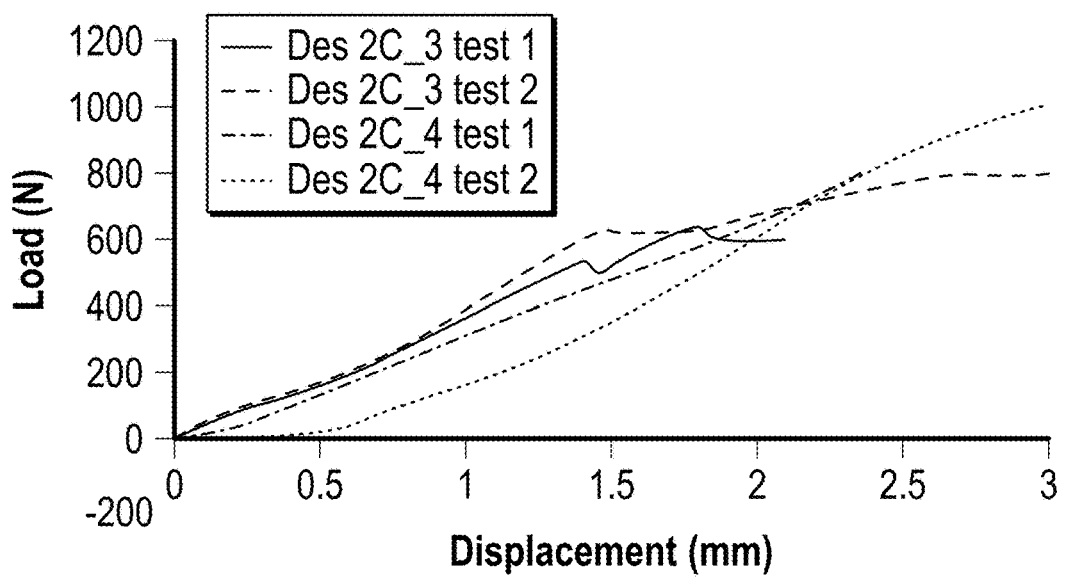
FIG. 18B graphically illustrates displacement as a function of shear load for FIG. 16D.
Figure 19A:
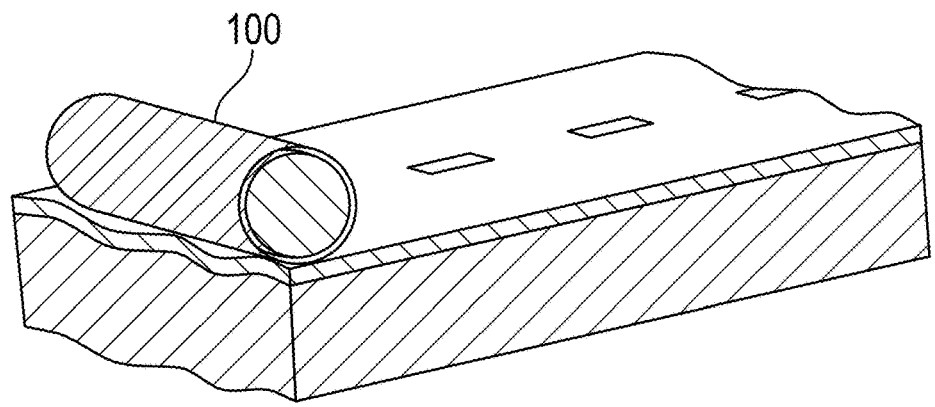
FIG. 19A is a perspective view of a rolled-up mat positioned on a runway.
Figure 19B:
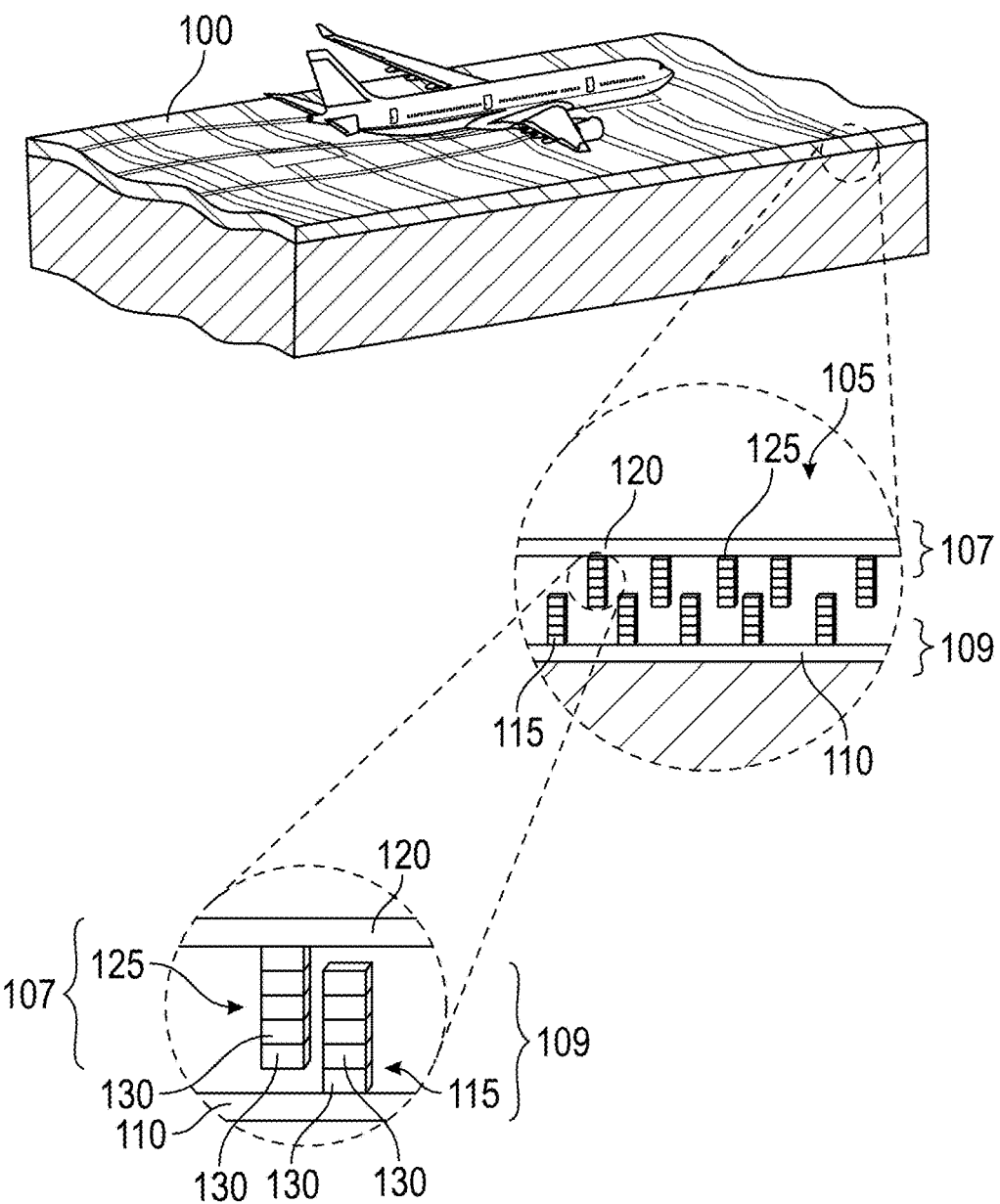
FIG. 19B is a perspective view of a deployed mat on a runway receiving an aircraft.
Figure 21A:
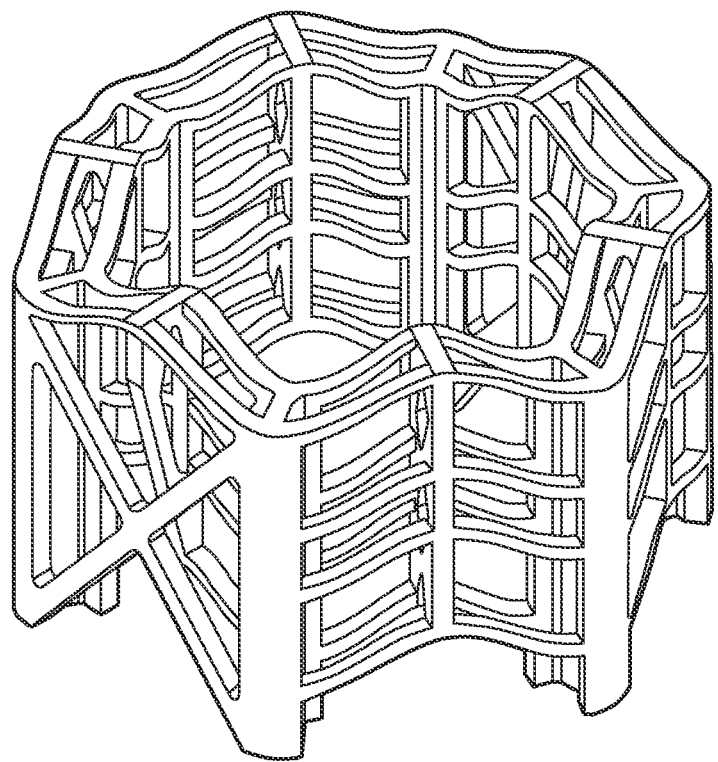
FIG. 21A is a perspective view of a PXCM unit cell with six hexagonally spaced support members defining six hexagonally arrayed sides, two opposing sides defining x-shaped struts extending between adjacent support members, and the remaining sides define parallel struts extending between adjacent support members.
Figure 21B:
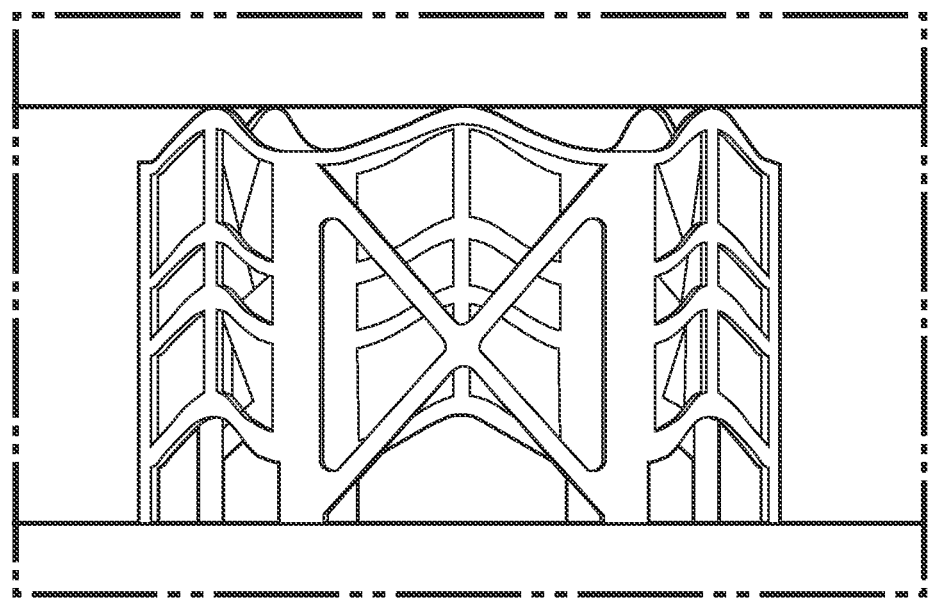
FIG. 21B is an elevation view of the unit cell of FIG. 21A compressed between two opposing steel plates.
Figure 21C:
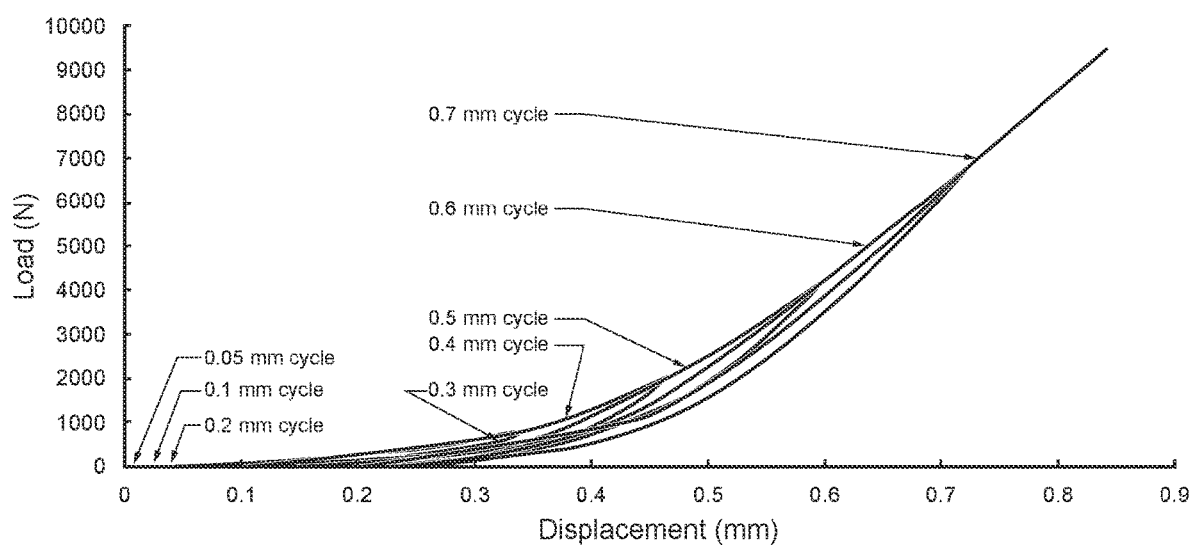
FIG. 21C graphically illustrates displacement as a function of load for several loading cycles generated from FIG. 21B.
Figure 21D:
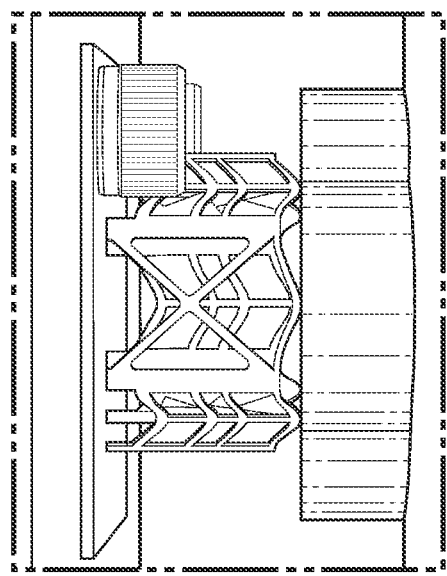
FIGS. 21D-E are elevation views of FIG. 21B with 0% shear fixture before (21D) and after (21E) the onset of cyclic loading.
Figure 21E:
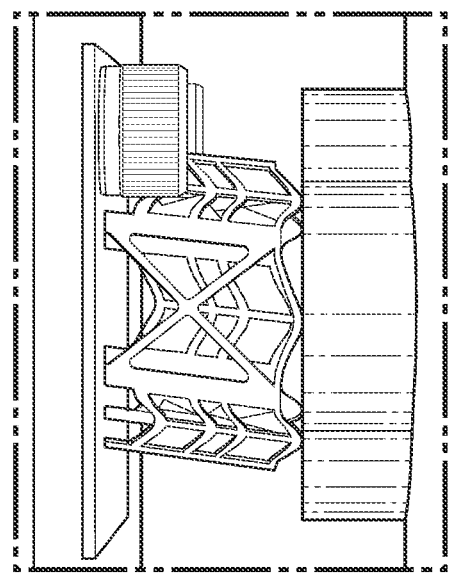
Figure 21F:
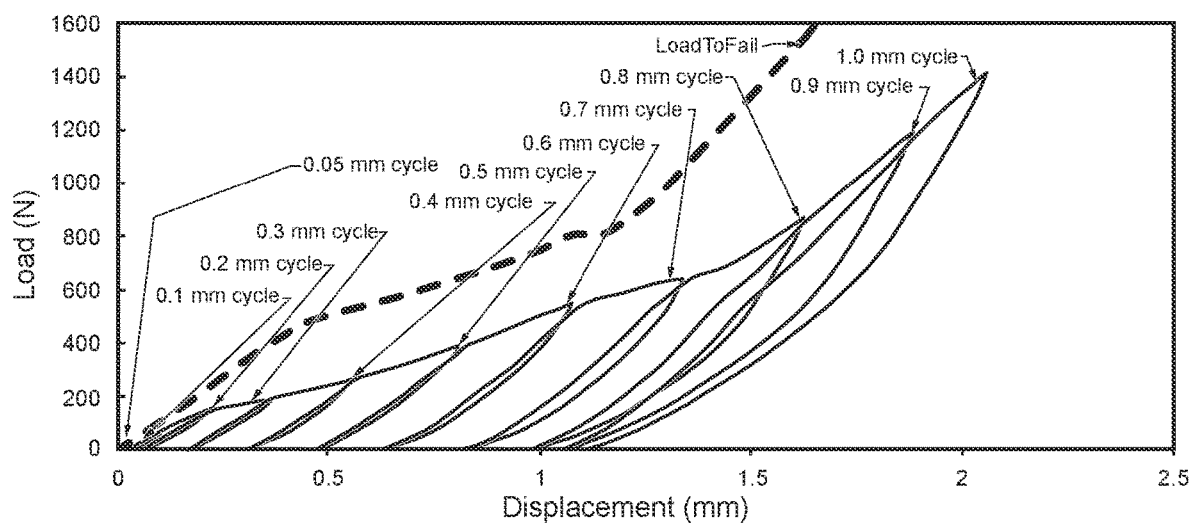
FIG. 21F graphically illustrates the cyclic loading displacement curves for FIGS. 21D-21E.
Figure 21G:
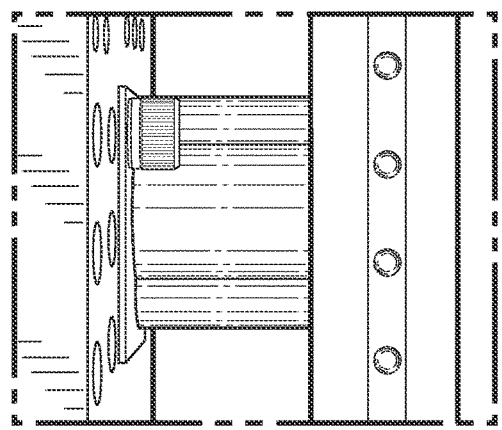
FIG. 21G is an elevation view of FIG. 21B with 100% shear fixture.
Figure 21H:
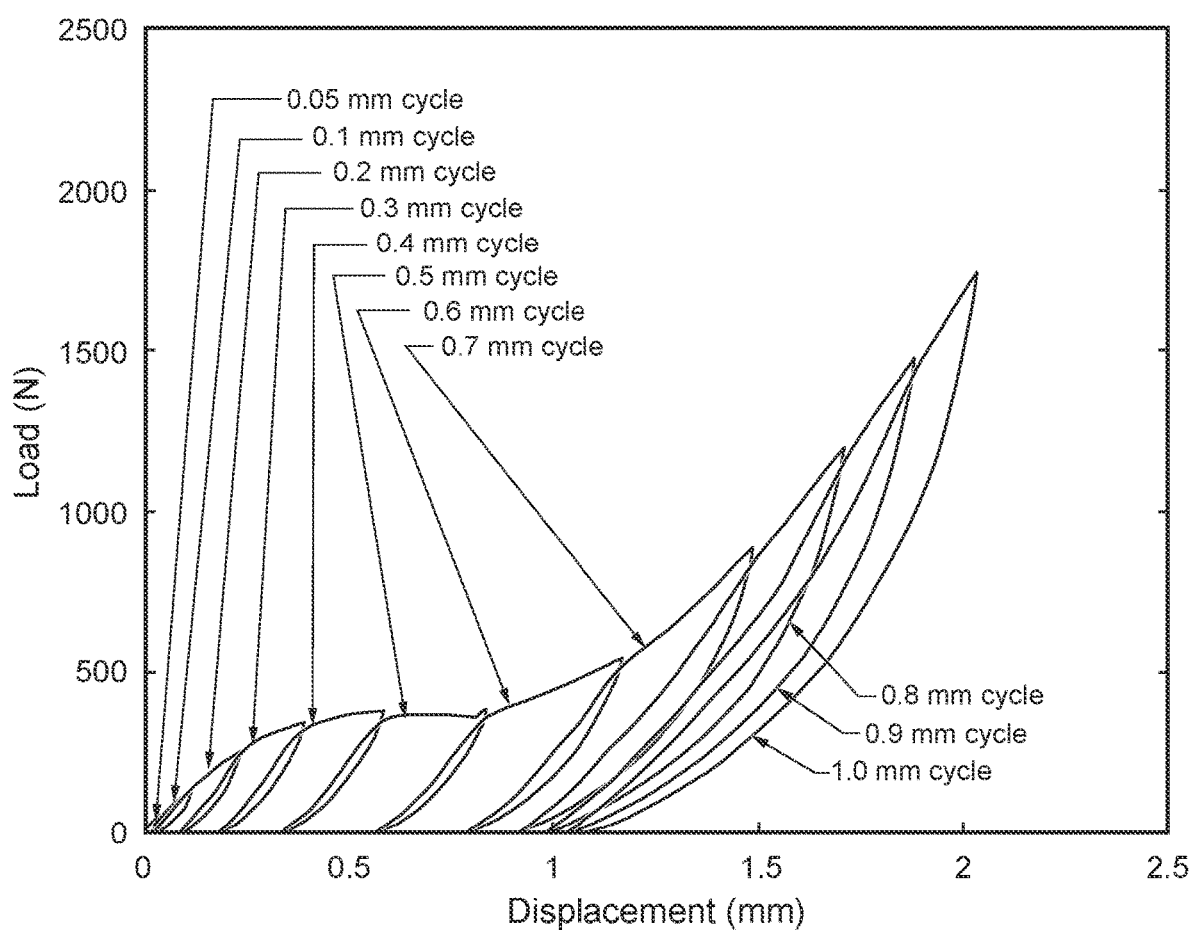
FIG. 21H graphically illustrates cyclic loading displacement curves for FIG. 21G.

Shear loading tests were conducted on the 2C_3 and 2C_4 design embodiments. The shear load experimental set up (Design 2C_4 sample B) is shown in FIG. 18A. The shear load-displacement curves for the Design 2C_3 and 2C_4 samples included in these experiments are shown in FIG. 18B. Neither of these designs was able to achieve the 4-kN target load before the connections in the load frame failed. Thus, the shear load-displacement curves shown here approximate the actual curves for each of the samples. This can be seen especially in the curve for test 1 of Design 2C_3 where the curve shows a "kink" resulting from relative motion between the sample and the load frame. This is not the sample breaking, but rather a result of the experimental procedure and sample fixture design.

Results from compression and shear load testing on the 4-beam concentric multi-beam PXCMs suggest Design 2C_4 can withstand a compressive load in excess of 9.5 kN (more than twice the target load) without yielding. Additionally, tests of Design 2C_4 display a secondary load-carrying capability approaching 40 kN per column (before compaction) as the displacement of the sinusoidal beams reaches a plateau (at approximately 3.0 mm) and the opposing plates (upper and lower) of each tile come in contact with the vertical corner columns of the hexagonal structure.

In operation, a lightweight runway mat 100 may be assembled from a plurality of interconnected tiles 105, each tile 105 having two matable parts 107, 109, the first part 107 having base portion or bottom layer 110 having a first plurality of spaced PXCM columns 115 extending therefrom operationally connected/connectable to the second part 109 having a loading platform portion or top layer 120 having a second plurality of spaced PXCM columns 125 extending therefrom. The respective columns 115, 125 are typically identical. The first and second tile portions 107, 109 are matably interconnectible, wherein each respective column 115, 125 defines a plurality of operationally connected phase transforming cells 130. Each respective cell 130 has a first and a second stable geometry, so that energy transfer is required to shift from one stable geometric configuration to the other. A plane landing on and/or taxiing across such a mat 100 compresses the phase transforming cells, transferring energy to the mat 100 which allows the cells 130 to shift between stable geometries. Other vehicles traversing the mat 100 likewise induce phase transformations in the cells 130. After the plane has left the mat 100, the cells 130 shift back to their original configurations. The mat 100 is typically able to withstand compressive forces of at least 2.5 kN, more typically at least 5 kN, still more typically at least 10 kN, and yet more typically at least 40 kN. The mat 100 is typically able to remain functional after at least 2000 take-off/landing cycles, more typically at least 2500 take-off/landing cycles, and still more typically at least 3000 take-off/landing cycles.

The top and bottom layers 110, 120 are typically made of a structural material, such as steel or aluminum, but may also be made of structural composite materials, carbon fiber and/or glass fiber reinforced composites, ceramics, cermets, or the like. The tiles 105 are interconnected, and may be hingedly or flexibly connected such that the resulting mat 100 is sufficiently flexible so as to be rolled up for transport or when not in use.

FIGS. 20-22 relate to another set (set D) of PXCM unit cell configurations for stacking into hexagonal columns for use in runway mats. These cells are similar to those of set C of FIG. 8, but with X-shaped stretching dominated faces added t maintain structural integrity of the hexagonal cells, while also allowing for a reduction in mass. Strut-based lattices can either be stretching or bending dominated. A strut-based lattice is said to be stretching-dominated when a majority of the composing struts experience primarily axial loads in response to a global load applied to the lattice. Conversely, a strut-based lattice is said to be bending dominated when a majority of the composing struts experience bending about the connective joints in response to a global load applied to the lattice. A very useful classification criterion exists that distinguishes between bending- and stretching-dominated structures, known as the Maxwell Stability Criterion, which is listed for 2D and 3D lattices respectively below.

$$M=b-2j+3$$

$$M=b-3j+6$$

This classification can be derived from Maxwell's stability criterion, which can determine if a lattice made of b struts (i.e. bars, beams) and j joints (i.e. intersections at which separate struts are connected) is rigid. These expressions can be used to determine if a structure is stretching- or bending-dominated with the following conditions on M $$M \to \begin{cases} M < 0, \text{ bending dominated} \\ M = 0, \text{ stretching dominated} \\ M > 0, \text{ over-constrained, stretching dominated} \end{cases}$$

The expression above states the three possible conditions that the value of M can achieve. If M is less than zero, this means that the lattice is bending dominated and not rigid. If M is equal to zero, the lattice is stretching dominated and rigid. If M is greater than zero, it is still stretching dominated and rigid, however it is also over-constrained, meaning that mass can be taken away from the lattice by removing struts, without reverting the lattice to being bending-dominated. It is additionally interesting to note that while the unit cell of a cellular material may be bending dominated, a cellular structure consisting of multiple unit cells may be stretching dominated.

Most cellular materials are bending dominated; however, it is beneficial to construct a cellular material/lattice such that it is stretching dominated. Stretching dominated cellular materials/lattices have improved efficiency with regards to weight over their bending-dominated counterparts.

Example

A runway mat is constructed from a plurality of base platforms, each respective base platform having a first plurality of phase transforming columns extending from a respective flat member and defining a plurality of respective generally columnar or cylindrical voids. Each respective base platform is lockingly engaged to one of a plurality of respective plane-engaging runway platforms. Each respective plane-engaging runway platform has a second, reversed pattern of phase transforming columns extending from a respective flat member and defining a second plurality of columnar or generally cylindrical voids, such that each respective plane-engaging runway platform is lockingly engagable to a respective base platform to yield a landing segment with parallel top and bottom flat members. Each respective phase transforming column is further comprised of a plurality of stacked operationally connected phase transforming cellular members selected from the configurations of group D. Each respective phase transforming cellular member can shift from a first stable configuration to a second stable configuration in response to an applied load. Each respective base plate is made of a 0.5 mm 17-4 stainless steel/1.38 mm aluminum composite. Each PXCM cell and PXCM column is made of 17-4 stainless steel. Each respective cell has six hexagonally spaced support members defining six hexagonally arrayed sides. Two opposing sides define x-shaped struts extending between adjacent support members, with the remaining sides (and in some cases all six sides) defining parallel struts extending between adjacent support members.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

What is claimed is:

1. An airplane runway mat, comprising:
    a base portion having a first plurality of spaced columns extending therefrom;
    a loading platform portion having a second plurality of spaced columns extending therefrom;
        wherein the base portion and loading platform portion are matably interconnectible;
    wherein each respective column defines a plurality of operationally connected phase transforming cells;
        wherein each respective cell has a first and a second stable geometry; and
    wherein energy transfer is required to shift from one stable geometric configuration to the other;
        wherein each respective phase transforming cell is steel and wherein each respective base plate is a steel/aluminum composite.

2. The mat of claim 1 wherein the mat is flexible.

3. The mat of claim 1 wherein each respective spaced column is a steel hexagonal PXMC column.

4. The mat of claim 1 wherein each respective spaced column is metastable.

5. The mat of claim 1 wherein each respective cell further comprises six hexagonally spaced support members defining six hexagonally arrayed sides; wherein two opposing sides define x-shaped struts extending between adjacent support members; wherein the remaining sides define parallel struts extending between adjacent support members.

6. The mat of claim 5 wherein all six sides define parallel struts extending between adjacent support members.

7. The mat of claim 1 wherein the mat can withstand a compressive load of at least 40 kN without yielding.

8. The mat of claim 1 wherein each respective spaced column is bistable.

9. The flexible mat of claim 8 wherein the mat can withstand a compressive load of at least 40 kN.

10. A flexible mat system, comprising:
    a plurality of base platforms, each respective base platform having a first pattern of phase transforming columns and voids extending from a respective flat member;
    a plurality of plane-engaging composite runway platforms, each respective plane-engaging composite runway platform having a second, reversed pattern of phase transforming columns and voids extending from a respective flat member such that each respective plane-engaging runway platform is lockingly engagable to a respective base platform to yield a landing segment with parallel top and bottom flat members;
    wherein each respective phase transforming column is further comprised of a plurality of stacked operationally connected phase transforming cellular members;

wherein each respective phase transforming cellular member can shift from a first stable configuration to a second stable configuration in response to an applied load;

wherein each respective cell further comprises six hexagonally spaced support members defining six hexagonally arrayed sides;

wherein two opposing sides define x-shaped struts extending between adjacent support members;

wherein the remaining sides define parallel struts extending between adjacent support members; and wherein each respective phase transforming column is a steel hexagonal PXMC column.

11. The flexible mat system of claim 10 wherein each respective phase transforming cellular member can shift from the second stable configuration to the first stable configuration in response to removal of the applied load.

12. The flexible mat system of claim 10 wherein each respective phase transforming column is a steel hexagonal PXMC column.

13. The flexible mat of claim 10 wherein the mat can withstand a compressive load of at least 2.5 kN.

14. The flexible mat of claim 10 wherein the mat can withstand a compressive load of at least 5 kN.

15. The flexible mat of claim 10 wherein the mat can withstand a compressive load of at least 9.5 kN.

16. An energy absorbing mat, comprising:
a first elongated plate member portion having a first plurality of spaced columns extending therefrom;
a second elongated plate member portion;
wherein the respective first and second elongated plate member portions are matably interconnectible;
wherein each respective column defines a plurality of operationally connected phase transforming cells;
wherein each respective spaced column is a steel hexagonal PXMC column;
wherein each respective cell has a first and a second stable geometry; and
wherein energy transfer is required to shift from one stable geometric configuration to the other.

17. The energy absorbing mat of claim 16 wherein the energy absorbing mat can withstand a compressive load of at least 9.5 kN.

18. The energy absorbing mat of claim 16 wherein the second elongated plate member portion has a second plurality of spaced columns extending therefrom.

* * * * *